United States Patent
Varadaraj et al.

(10) Patent No.: US 6,734,144 B2
(45) Date of Patent: May 11, 2004

(54) SOLIDS-STABILIZED WATER-IN-OIL EMULSION AND METHOD FOR USING SAME

(75) Inventors: Ramesh Varadaraj, Flemington, NJ (US); James R. Bragg, Houston, TX (US); Monte K. Dobson, Bellaire, TX (US); Dennis G. Peiffer, Annandale, NJ (US); John S. Huang, Annandale, NJ (US); Donald B. Siano, Westfield, NJ (US); Cornelius H. Brons, Washington, NJ (US); Chester W. Elspass, Alpha, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 264 days.

(21) Appl. No.: 09/819,331

(22) Filed: Mar. 28, 2001

(65) Prior Publication Data

US 2001/0049902 A1 Dec. 13, 2001

Related U.S. Application Data

(60) Provisional application No. 60/199,457, filed on Apr. 25, 2000, provisional application No. 60/199,459, filed on Apr. 25, 2000, and provisional application No. 60/199,566, filed on Apr. 25, 2000.

(51) Int. Cl.$^7$ .................................................. C09K 7/06
(52) U.S. Cl. ...................... 507/103; 507/203; 507/904; 507/906; 507/108; 507/207; 507/140; 507/145; 507/267; 507/269; 507/277; 516/22; 166/305.1
(58) Field of Search .......................... 516/33; 507/103, 507/203, 906, 904, 108, 207, 140, 145, 267, 269, 277; 166/305.1

(56) References Cited

U.S. PATENT DOCUMENTS

| | | | | |
|---|---|---|---|---|
| 2,996,450 A | * | 8/1961 | Zech et al. | 507/103 |
| 3,804,760 A | * | 4/1974 | Darley | 507/906 |
| 4,012,329 A | * | 3/1977 | Hayes | 516/22 |
| 4,219,082 A | | 8/1980 | Kalfoglou | 166/273 |
| 4,384,997 A | | 5/1983 | Detroit | 260/124 |
| 4,790,382 A | | 12/1988 | Morrow et al. | 166/274 |
| 5,095,986 A | | 3/1992 | Naae et al. | 166/274 |
| 5,294,353 A | * | 3/1994 | Dill | 516/22 |
| 5,350,014 A | | 9/1994 | McKay | 166/263 |
| 5,603,863 A | * | 2/1997 | Dahms | 516/22 |
| 5,855,243 A | | 1/1999 | Bragg | 166/275 |
| 5,910,467 A | | 6/1999 | Bragg | 507/202 |
| 5,927,404 A | | 7/1999 | Bragg | 166/275 |
| 6,068,054 A | | 5/2000 | Bragg | 166/270 |
| 6,410,488 B1 | * | 6/2002 | Fefer et al. | 507/103 |

OTHER PUBLICATIONS

Varadaral, "Mineral Acid Enhanced Thermal Treatment for Viscosity Reduction of Oils", U.S. Patent Application Publication No. 2002/0033265, Mar. 21, 2002, pp. 1–10.

* cited by examiner

Primary Examiner—Philip C. Tucker
(74) Attorney, Agent, or Firm—Phillip Weo; Doug Collins

(57) ABSTRACT

A method for enhancing the stability of a solids-stabilized water-in-oil emulsion by pretreating the oil prior to emulsification. The pretreatment step can be accomplished by adding dilute acid to the oil, adding a lignosulfonate additive to the oil, sulfonating the oil, thermally oxidizing the oil, thermally treating the oil in an inert environment, and combinations thereof. The emulsion can be used in enhanced oil recovery methods, including using the emulsion as a drive fluid to displace hydrocarbons in a subterranean formation, and using the emulsion as a barrier fluid for diverting flow of fluids in the formation.

80 Claims, No Drawings

SOLIDS-STABILIZED WATER-IN-OIL EMULSION AND METHOD FOR USING SAME

REFERENCE TO RELATED APPLICATIONS

This application claims the benefit of U.S. Provisional Patent Application Nos. 60/199,457, 60/199,459, and 60/199,566 each filed Apr. 25, 2000.

FIELD OF THE INVENTION

The present invention relates to a solids-stabilized water-in-oil emulsion used for enhanced crude oil recovery. More specifically, the stability of the solids-stabilized water-in-oil emulsion is enhanced by the method of pretreating the oil prior to emulsification. The pretreatment step can be accomplished by adding dilute acid to the oil, adding a lignosulfonate additive to the oil, sulfonating the oil, thermally treating the oil in an inert environment, thermally oxidizing the oil, and combinations thereof. The improved emulsion may be used either as a drive fluid to displace hydrocarbons from a subterranean formation or as a barrier fluid for diverting the flow of hydrocarbons in the formation.

BACKGROUND OF THE INVENTION

It is well known that a significant percentage of oil remains in a subterranean formation after the costs of primary production rise to such an extent that further oil recovery is cost ineffective. Typically, only one-fifth to one-third of the original oil in place is recovered during primary production. At this point, a number of enhanced oil recovery (EOR) procedures can be used to further recover the oil in a cost-effective manner. These procedures are based on re-pressuring or maintaining oil pressure and/or mobility.

For example, waterflooding of a reservoir is a typical method used in the industry to increase the amount of oil recovered from a subterranean formation. Waterflooding involves simply injecting water into a reservoir, typically through an injection well. The water serves to displace the oil in the reservoir to a production well. However, when waterflooding is applied to displace viscous heavy oil from a formation, the process is inefficient because the oil mobility is much less than the water mobility. The water quickly channels through the formation to the producing well, bypassing most of the oil and leaving it unrecovered. For example, in Saskatchewan, Canada, primary production crude has been reported to be only about 2 to 8% of the original oil in place, with waterflooding yielding only another 2 to 5% of that oil in place. Consequently, there is a need to either make the water more viscous, or use another drive fluid that will not channel through the oil. Because of the large volumes of drive fluid needed, it must be inexpensive and stable under formation flow conditions. Oil displacement is most efficient when the mobility of the drive fluid is significantly less than the mobility of the oil, so the greatest need is for a method of generating a low-mobility drive fluid in a cost-effective manner.

Oil recovery can also be affected by extreme variations in rock permeability, such as when high-permeability "thief zones" between injection wells and production wells allow most of the injected drive fluid to channel quickly to the production wells, leaving oil in other zones relatively unrecovered. A need exists for a low-cost fluid that can be injected into such thief zones (from either injection wells or production wells) to reduce fluid mobility, thus diverting pressure energy into displacing oil from adjacent lower-permeability zones.

In certain formations, oil recovery can be reduced by coning of either gas downward or water upward to the interval where oil is being produced. Therefore, a need exists for a low-cost injectant that can be used to establish a horizontal "pad" of low mobility fluid to serve as a vertical barrier between the oil producing zone and the zone where coning is originating. Such low mobility fluid would retard vertical coning of gas or water, thereby improving oil production.

For moderately viscous oils—i.e., those having viscosities of approximately 20–100 centipoise (cP)—water-soluble polymers such as polyacrylamides or xanthan gum have been used to increase the viscosity of the water injected to displace oil from the formation. For example, polyacrylamide was added to water used to waterflood a 24 cP oil in the Sleepy Hollow Field, Nebr. Polyacrylamide was also used to viscosity water used to flood a 40 cP oil in the Chateaurenard Field, France. With this process, the polymer is dissolved in the water, increasing its viscosity.

While water-soluble polymers can be used to achieve a favorable mobility waterflood for low to moderately viscous oils, usually they cannot economically be applied to achieving a favorable mobility displacement of more viscous oils—i.e., those having viscosities of approximately 100 cP or higher. These oils are so viscous that the amount of polymer needed to achieve a favorable mobility ratio would usually be uneconomic. Further, as known to those skilled in the art, polymer dissolved in water often is desorbed from the drive water onto surfaces of the formation rock, entrapping it and rendering it ineffective for viscosifying the water. This leads to loss of mobility control, poor oil recovery, and high polymer costs. For these reasons, use of polymer floods to recover oils having viscosities in excess of 100 cP is not usually technically or economically feasible. Also, performance of many polymers is adversely affected by levels of dissolved ions typically found in formations, placing limitations on their use and/or effectiveness.

Water and oil macroemulsions have been proposed as a method for producing viscous drive fluids that can maintain effective mobility control while displacing moderately viscous oils. For example, water-in-oil and oil-in-water macroemulsions have been evaluated as drive fluids to improve oil recovery of viscous oils. Such emulsions have been created by addition of sodium hydroxide to acidic crude oils from Canada and Venezuela. The emulsions were stabilized by soap films created by saponification of acidic hydrocarbon components in the crude oil by sodium hydroxide. These soap films reduced the oil/water interfacial tension, acting as surfactants to stabilize the water-in-oil emulsion. It is well known, therefore, that the stability of such emulsions substantially depends on the use of sodium hydroxide (i.e., caustic) for producing a soap film to reduce the oil/water interfacial tension.

Various studies on the use of caustic for producing such emulsions have demonstrated technical feasibility. However, the practical application of this process for recovering oil has been limited by the high cost of the caustic, likely adsorption of the soap films onto the formation rock leading to gradual breakdown of the emulsion, and the sensitivity of the emulsion viscosity to minor changes in water salinity and water content. For example, because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with higher-salinity resident water, causing breakdown of the low-tension stabilized emulsion.

Various methods have been used to selectively reduce the permeability of high-permeability "thief" zones in a process generally referred to as "profile modification." Typical agents that have been injected into the reservoir to accomplish a reduction in permeability of contacted zones include polymer gels or cross-linked aldehydes. Polymer gels are formed by crosslinking polymers such as polyacrylamide, xanthan, vinyl polymers, or lignosulfonates. Such gels are injected into the formation where crosslinking reactions cause the gels to become relatively rigid, thus reducing permeability to flow through the treated zones.

In most applications of these processes, the region of the formation that is affected by the treatment is restricted to near the wellbore because of cost and the reaction time of the gelling agents. Once the treatments are in place, the gels are relatively immobile. This can be a disadvantage because the drive fluid (for instance, water in a waterflood) eventually finds a path around the immobile gel, reducing its effectiveness. Better performance should be expected if the profile modification agent could slowly move through the formation to plug off newly created thief zones, penetrating significant distances from injection or production wells.

McKay, in U.S. Pat. No. 5,350,014, discloses a method for producing heavy oil or bitumen from a formation undergoing thermal recovery. McKay describes a method for producing oil or bitumen in the form of oil-in-water emulsions by carefully maintaining the temperature profile of the swept zone above a minimum temperature, $T_c$. If the temperature of the oil-in-water emulsion is maintained above this minimum temperature, the emulsion will be capable of flowing through the porous subterranean formation for collection at the production well. McKay describes another embodiment of his invention, in which an oil-in-water emulsion is inserted into a formation and maintained at a temperature below the minimum temperature. This relatively immobile emulsion is used to form a barrier for plugging water-depleted thief zones in formations being produced by thermal methods, including control of vertical coning of water. However, the method described by McKay requires careful control of temperature within the formation zone and, therefore, is useful only for thermal methods of recovery. Consequently, the method disclosed by McKay could not be used for non-thermal (referred to as "cold flow") recovery of heavy oil.

A new process has recently been disclosed that uses novel solids-stabilized emulsions for enhanced oil recovery. U.S. Pat. No. 5,927,404 describes a method of using the novel solids-stabilized emulsion as a drive fluid to displace hydrocarbons for enhanced oil recovery. U.S. Pat. No. 5,855,243 claims a similar method of using a solids-stabilized emulsion, whose viscosity is reduced by the addition of a gas, as a drive fluid. U.S. Pat. No. 5,910,467 claims the novel solids-stabilized emulsion described in U.S. Pat. No. 5,855,243. U.S. Pat. No. 6,068,054 describes a method for using the novel solids-stabilized emulsion as a barrier for diverting the flow of fluids in the formation.

Preparing a solids-stabilized emulsion with optimum properties is key to successfully using the emulsion for enhanced oil recovery. Two important properties are an emulsion's stability and its rheology. The solids stabilized emulsion should be shelf-stable, that is, the emulsion should be able to remain a stable emulsion without water or oil breakout when left undisturbed. In addition, the emulsion should be stable under flow conditions through porous media, i.e. in a subterranean formation. The emulsion's rheological characteristics are also important. For instance, EOR methods for which this emulsion may be used include injecting the emulsion as a drive or barrier fluid into a subterranean formation. Accordingly, the emulsion should have an optimum viscosity for injection and to serve as either a drive or barrier fluid. In practicing EOR, and particularly with using the emulsion as a drive fluid, it is useful to match the rheology of the emulsion with the rheology of subterranean oil to be produced. Oil displacement using a drive fluid is typically more efficient when the drive fluid has a greater viscosity than that of the oil to be displaced. In addition to providing stability to the solids-stabilized emulsion, the invention described herein will allow the user to prepare solids-stabilized emulsions with a wide range of rheology to match that of the oil to be produced.

Because water and oil are readily available at most production sites, water-in-oil emulsions are a good choice for making the solids-stabilized emulsions for EOR. Some oils possess the chemical composition and physical properties necessary to make stable solids-stabilized water-in-oil emulsions with a wide range of solids. The added solids interact with components of oil, i.e., polars and asphaltenes, resulting in an increase in their effectiveness as surface-active agents. This interaction is specific to the type of solids and the composition of the oil to which they are added.

However, if the oil does not contain the right type and sufficient concentration of polar and asphaltene compounds, the addition of solids is ineffective because the solids are not adequately and suitably modified to function as stabilizers of the oil-water interface. Accordingly, some oils do not form stable solids-stabilized water-in-oil emulsions with any solids, or, some oils may form stable emulsions with some types of solids, e.g. silica, and may not form similar stable emulsions with other types of solids, e.g., clays and coal dust. The previously cited art suggests that asphaltenes or polar hydrocarbons may be added to these oils to improve their ability to form stable emulsions. U.S. Pat. No. 5,855,243, column 7, lines 6–10; U.S. Pat. No. 5,927,404 column 6, lines 44–47; U.S. Pat. No. 5,910,467 column 7, lines 3–6. However, this addition is not always successful because incompatibility between some oil components and the added asphaltenes and polars can result in phase separation or rejection of the added compounds. These cases limit the scope of the inventions disclosed in the U.S. Patents cited above.

To broaden the scope and improve the solids-stabilized emulsions described in U.S. Pat. Nos. 5,927,404, 5,855,243, 5,910,467, 6,068,054, an approach is needed that suitably modifies the oil composition so that it is responsive to the addition of solids for the preparation of stable water-in-oil emulsions. The present invention satisfies this need.

SUMMARY OF THE INVENTION

According to the invention, there is provided a method for enhancing the stability of a solids-stabilized water-in-oil emulsion, said method comprising the step of pretreating at least a portion of the oil prior to emulsification.

In one embodiment of the invention, the oil pretreatment step comprises the addition of dilute organic or mineral acid to at least a portion of the oil prior to emulsification.

In another embodiment of the invention, the oil pretreatment step comprises the addition of a lignosulfonate additive to at least a portion of the oil prior to emulsification.

In another embodiment of the invention, the oil pretreatment step comprises sulfonating at least a portion of the oil prior to emulsification.

In another embodiment of the invention, the oil pretreatment step comprises thermally treating at least a portion of the oil in an inert environment prior to emulsification.

In another embodiment of the invention, the oil pretreatment step comprises thermally oxidizing at least a portion of the oil prior to emulsification.

Combinations of these embodiments may also be used. Further disclosed is a method for producing hydrocarbons from a subterranean formation, comprising:
 a) making a solids-stabilized water-in-oil emulsion with the pretreated oil;
 b) contacting the formation with said solids-stabilized emulsion, and
 c) producing hydrocarbons from the formation using said solids-stabilized emulsion.

DETAILED DESCRIPTION OF THE INVENTION

Solids-stabilized water-in-oil emulsions have been generally described in U.S. Pat. Nos. 5,927,404, 5,855,243 and 5,910,467. Such emulsions are made by the process of combining oil with submicron to micron-sized solid particles and mixing with water until the solids-stabilized water-in-oil emulsion is formed.

As disclosed in the above referenced U.S. patents, the solid particles should have certain physical properties. The individual particle size should be sufficiently small to provide adequate surface area coverage of the internal droplet phase. If the emulsion is to be used in a porous subterranean formation, the average particle size should be smaller than the average diameter of pore throats in the porous subterranean formation. Methods for determining average particle size are discussed in the previously cited U.S. patents. The solid particles may be spherical in shape, or non-spherical in shape. If spherical in shape, the solid particles should preferably have an average size of about five microns or less in diameter, more preferably about two microns or less, even more preferably about one micron or less and most preferably, 100 nanometers or less. If the solid particles are non-spherical in shape, they should preferably have an average size of about 200 square microns total surface area, more preferably about twenty square microns or less, even more preferably about ten square microns or less and most preferably, one square micron or less. The solid particles must also remain undissolved in both the oil and water phase of the emulsion under the formation conditions.

The present invention allows the formation of stable solids-stabilized water-in-oil emulsions from oil that would otherwise lack adequate polar and asphaltene compounds to form such stable emulsions. The oil needed to make a stable emulsion using the method described by U.S. Pat. Nos. 5,927,404, 5,855,243 and 5,910,467, has to contain a sufficient amount of asphaltenes, polar hydrocarbons, or polar resins to stabilize the solid-particle-oil interaction. But, as noted, some oils do not have the sufficient type or amounts of these compounds to allow the formation of stable solids-stabilized emulsions. Pursuant to the present invention, the oil is pretreated to promote the formation of a stable solids-stabilized water-in-oil emulsion.

The oil used to make the solids-stabilized emulsion of the current invention can be oil of any type or composition, including but not limited to crude oil, refined oil, oil blends, chemically treated oils, or mixtures thereof. Crude oil is unrefined liquid petroleum. Refined oil is crude oil that has been purified in some manner, for example, the removal of sulfur. Crude oil is the preferred oil used to practice this invention, more preferably, the crude oil is produced from the formation where the emulsion is to be used. The produced crude oil may contain formation gas, or formation water or brine mixed with the oil. It is preferred to dehydrate the crude oil prior to treatment, however, mixtures of oil, formation gas and/or formation brine may also be used in this invention.

Preferably, formation water is used to make the emulsion, however, fresh water can also be used and the ion concentration adjusted as needed to help stabilize the emulsion under formation conditions.

Solids-stabilized water-in-oil emulsions according to the present invention are useful in a variety of enhanced oil recovery applications generally known in the art, including, without limitation, using such emulsions (a) as drive fluids to displace hydrocarbons in a subterranean formation; (b) to fill high permeability formation zones for "profile modification" applications to improve subsequent EOR performance; and (c) to form effective horizontal barriers, for instance, to form a barrier to vertical flow of water or gas to reduce coning of the water or gas to the oil producing zone of a well.

Attached in Table 1 are detailed physical and chemical property characterization data for three different types of crude oils which are referenced as Crude Oil #1, Crude Oil #2 and Crude Oil #3. Crude Oil #1 and Crude Oil #3 possess properties that enable formation of stable water in crude oil emulsions with the addition of solids, as described in U.S. Pat. Nos. 5,927,404, 5,855,243 and 5,910,467. However, Crude Oil #2 does not form a stable solids-stabilized water-in-oil emulsion when using the same method.

TABLE 1

PHYSICAL & CHEMICAL PROPERTIES OF CRUDE OILS

| PROPERTY | Crude Oil #1 | Crude Oil #2 | Crude Oil #3 |
|---|---|---|---|
| API Gravity | 16.8 | 15.5 | 8.6 |
| Viscosity (cP) (25° C., 1 sec$^{-1}$) | 4800 | 2400 | 384,616 |
| Interfacial Tension (dynes/cm) Sea Water | 2.2 | 33.7 | |
| Asphaltenes (n-heptane insolubles (wt. %)) | 0.1 ± 0.02 | 2.6 | 13.7 |
| Toluene Equivalence | 0.0 | 14 | 20 |
| Sulfur (wt. %) | 0.12 | 0.98 | 3.89 |
| Nitrogen (wt. 1%) | 0.18 | 0.07 | 0.19 |
| Distillation Cuts (Vol. %) | | | |
| IC5/175° F. Lt. Naph | — | 0.6 | 0.2 |
| 175/250° F. Med. Naph | — | 1.3 | — |
| 250/375° F. Hvy. Naph | 1.80 | 3.22 | 1.0 |
| 375/530° F. Kerosene | 7.83 | 12.39 | 4.8 |
| 530/650° F. Lt. Gasoil | 9.88 | 14.27 | 9.5 |
| 650/1049° F. PGO | 38.04 | 42.41 | 38.8 |
| 1049° F. + Resid | 42.45 | 25.80 | 45.7 |
| HPLC Fractions (wt. %) | | | |
| Mass Recovery | 83.8 | 56.6 | 66.99 |
| Saturates | 41.7 | 28.51 | 17.67 |
| 1-Ring | 7.5 | 11.40 | 10.07 |
| 2-Ring | 7.0 | 9.85 | 12.89 |
| 3-Ring | 7.6 | 7.96 | 10.15 |
| 4-Ring | 13.0 | 16.06 | 20.93 |
| Polars | 23.2 | 26.23 | 28.29 |
| Aromaticity | 17.1 | 20.27 | 22.37 |

TABLE 1-continued

PHYSICAL & CHEMICAL PROPERTIES OF CRUDE OILS

| PROPERTY | Crude Oil #1 | Crude Oil #2 | Crude Oil #3 |
|---|---|---|---|
| Iatrascan data | | | |
| Saturates | 27.2 | 19.4 | 6.4 |
| Aromatics | 44.7 | 44.7 | 42.5 |
| NSO's | 19.0 | 30.1 | 29.0 |
| Asphaltenes (npentane insolubles) (wt. %) | 8.9 | 5.8 | 22.1 |
| Arom./Saturates | 1.64 | 2.3 | 6.66 |
| NSO's/Asph. (n-pentane insoluble) | 2.13 | 5.19 | 1.31 |
| TAN | 6.2 | 6.2 | 3.13 |
| HPLC Determined Distribution of Acid Fractions (%) | | | |
| 250 MW | 8.5 | 47.2 | 22.4 |
| 300 MW | 23.9 | 24.5 | 20.7 |
| 425 MW | 30.5 | 15.9 | 20.4 |
| 600 MW | 20.4 | 7.0 | 14.6 |
| 750 MW | 16.7 | 5.4 | 21.7 |
| Acid Aromaticity | 8.6 | 17.2 | 19.0 |
| Metals (ppm) | | | |
| Ca | 30–160 | 4.22 | 1.83 |
| Na | 10.4–15.5 | 1.51 | 11.2 |
| V | 0.16–0.31 | 69.6 | 434 |
| Ni | 9.05–13.0 | 65.6 | 102 |

Crude Oil #2 differs from Crude Oils #1 and #3 in the following ways:
1. Crude Oil #2 has a higher resin/asphaltene ratio,
2. Crude Oil #2 has a higher proportion of lower molecular weight naphthenic acids, and
3. Crude Oil #2 has lower calcium and sodium as compared to the Crude Oil #1.

These differences suggest:
1. the surface-active species, i.e., asphaltenes and acids/resins, which are the key components essential for emulsification, are not readily available to stabilize the water droplets in Crude Oil #2, and
2. pretreatment of the oil to alter its physical properties and chemical composition is a potential route to enhance the stability of the emulsion.

Accordingly, the present invention describes a method of pretreating oil to increase the stability of the solids-stabilized emulsion. Several embodiments of this invention will now be described. As one of ordinary skill in the art can appreciate, an embodiment of this invention may be used in combination with one or more other embodiments of this invention, which may provide synergistic effects in stabilizing the solids-stabilized emulsion.

Pretreatment of Oil with Dilute Acid

One method of pretreating oil to enhance its ability to form a stable solids-stabilized water-in-oil emulsion is to pretreat the oil with dilute mineral or organic acid prior to emulsification. This acid pretreatment results in modifications to the oil and surface of the solids: (1) The basic nitrogen containing components of the oil are converted to the corresponding mineral or organic acid salts. These salts are more surface-active than the basic nitrogen containing components themselves and thus contribute to improving the stability of the solids-stabilized water-in-oil emulsion; (2) If the oil contains napthenic acids, the stronger mineral or organic acids displace the napthenic acids from the basic nitrogen containing compounds to which they are complexed thereby providing higher surface activity; (3) The protons from the acid act to protonate the anionic charged sites on the surface of the solids and thus modify the solids' surface to improve its interaction with the surface-active components of oil (either preexisting in the oil or generated by the acid treatment); (4) If the oil contains calcium and naphthenic acids, the mineral or organic acids can displace the calcium and free the naphthenic acids, which are more surface-active than the calcium naphthenates.

Making the Solids-stabilized Water-in-Oil Emulsion Using Dilute Acid Pretreatment To make this embodiment of the invention, dilute mineral or organic acid is added to the oil prior to emulsification. Solid particles can be added to the oil either before or after the acid pretreatment, but it is preferred to add the solids to the oil and then acid pretreat the oil with the solids. After the acid pretreatment and solids addition, the solids-stabilized emulsion is formed by adding water in small aliquots or continuously and mixing, preferably at a rate of between 1000 to 12000 rpm, for a time sufficient to disperse the water as small droplets in the continuous oil phase. It is preferred to have a water concentration in the water-in-oil emulsion of 40 to 80%, more preferably 50 to 65%, and most preferably 60%.

The acid is added to the oil with mixing, preferably for about 5 to 10 minutes at 25 to 40° C. The preferred acid treat rate is between 8 and 30,000 ppm. The dilute acid may be mineral acid, organic acid, a mixture of mineral acids, a mixture of organic acids, or a mixture of mineral and organic acids. The preferred mineral acids are hydrochloric and sulfuric acid. However, other mineral acids can be used, including but not limited to perchloric acid, phosphoric acid and nitric acid. The preferred organic acid is acetic acid. However, other organic acids may also be used including, but not limited to para-toluene sulfonic, alkyl toluene sulfonic acids, mono di and trialkyl phosphoric acids, organic mono or di carboxylic acids (e.g. formic), C3 to C16 organic carboxylic acids, succinic acid, and petroleum naphthenic acid. Petroleum naphthenic acid can also be added to increase the surface-activity in the oil, or oils containing high naphthenic acid can be blended with the oils of interest to provide the increased surface-activity.

The solid particles are preferably hydrophobic in nature. A hydrophobic silica, sold under the trade name Aerosil® R 972 (product of DeGussa Corp.) has been found to be an effective solid particulate material for a number of different oils. Other hydrophobic (or oleophilic) solids can also be used, for example, divided and oil wetted bentonite clays, kaolinite clays, organophilic clays or carbonaceous asphaltenic solids. The preferred treat rate of solids is 0.05 to 0.25 wt % based upon the weight of oil.

After the emulsion is prepared, its pH can be adjusted by adding a calculated amount of weak aqueous base to the emulsion for a time sufficient to raise the pH to the desired level. It is desirable to adjust emulsion pH in the 5 to 7 range. However, adjusting pH is optional as in some cases it is desirable to inject an acidic emulsion and allow the reservoir formation to buffer the emulsion to the reservoir alkalinity.

Ammonium hydroxide is the preferred base for pH adjustment. Stronger bases like sodium hydroxide, potassium hydroxide and calcium oxide have a negative effect on emulsion stability. One possible explanation for this effect is that strong bases tend to invert the emulsion, i.e. convert the water-in-oil emulsion to an oil-in-water emulsion. Such an inversion is undesirable for the purposes of this invention.

In addition to increasing the stability of the solids-stabilized water-in-oil emulsion, the acid pretreatment method results in an emulsion with lower viscosity compared to one produced without acid pretreatment. This reduced viscosity aids in enhancing the injectivity of the emulsion. Thus, one may decrease the viscosity of a solids-stabilized emulsion by suitably adjusting the amount of acid pretreatment. This ability to manipulate the viscosity of the emulsion allows the user to optimally match the Theological characteristics of the emulsion to that of the oil to be recovered specifically for the particular type EOR method used. As noted in U.S. Pat. Nos. 5,855,243 and 5,910,467, gas may also be added to further lower the viscosity of the emulsion.

Another embodiment of this invention is to pretreat a slipstream or master batch of oil with dilute acid as described above and subsequently mix the slipstream with a main stream of oil prior to water addition and emulsification. This main stream of oil is preferably untreated crude oil, however, it may be any oil, including oil that has been treated to enhance its ability to form a stable emulsion or treated to optimize its rheology. If this slipstream method is used, the amounts of solids and dilute acid needed for the slipstream treatment are scaled accordingly to obtain the desired amounts in the resulting emulsion.

EXAMPLES

The following laboratory tests were conducted to demonstrate the effectiveness of acid pretreatment on enhancing an oil's ability to form stable solids-stabilized water-in-oil emulsions. These examples focused on Crude Oil #2 and another crude oil, Crude Oil #4. Neither of these crude oils form stable solids-stabilized emulsions by the method described in U.S. Pat. Nos. 5,927,404, 5,855,243 and 5,910,467. Physical properties for Crude Oil #4 are given in Table 2. The tests demonstrated that the acid pretreatment enhanced the oils' abilities to form stable solids-stabilized emulsions. Stable emulsions were formed in the pH range of 1.2 to 7.0, and up to 72 wt % water was incorporated into these emulsions.

TABLE 2

| PHYSICAL & CHEMICAL PROPERTIES OF CRUDE OILS | |
| --- | --- |
| PROPERTY | Crude Oil #4 |
| API Gravity | 17.2 |
| Viscosity (cP) (25° C., 1 sec$^{-1}$) | 8500 |
| Asphaltenes (n-heptane insolubles) (wt. %) | 0.1 |
| Asphaltene (cyclohexane insolubles) (wt. %) | 3.25 |
| Toluene Equivalence | 0.0 |
| Sultbr (wt. %) | 0.12 |
| Nitrogen (wt. %) | 0.26 |
| Distillation Cuts (Vol. %) | |
| IC5/175° F. Lt. Naph | — |
| 175/250° F. Med. Naph | — |
| 250/375° F. Hvy. Naph | 0.03 |
| 375/530° F. Kerosene | 6.09 |
| 530/650° F. Lt. Gasoil | 8.67 |
| 650/1049° F. PGO | 36.48 |
| 1049° F. + Resid | 48.73 |
| HPLC Fractions (wt. %) | |
| Mass Recovery | 84.4 |
| Saturates | 43.3 |
| 1-Ring | 7.6 |
| 2-Ring | 6.8 |
| 3-Ring | 7.5 |
| 4-Ring | 12.6 |
| Polars | 22.2 |
| Aromaticity | 15.6 |
| Iatroscan Data | |
| Saturates | 35.4 |
| Aromatics | 39.8 |
| NSO's | 15.4 |
| Asphaltene | 9.4 |
| Arom./Saturates | 1.13 |

TABLE 2-continued

| PHYSICAL & CHEMICAL PROPERTIES OF CRUDE OILS | |
| --- | --- |
| PROPERTY | Crude Oil #4 |
| NSO's/Asph. | 1.64 |
| TAN | 5.4 |
| HPLC Determined Distribution of Acid Fractions (%) ** | |
| 250–300 MW | 15.4 |
| 300–425 MW | 14.7 |
| 425–600 MW | 27.1 |
| 600–750 MW | 21.5 |
| 750 + MW | 21.3 |
| Acid Aromaticity | 8.6 |
| Metals (ppm) | |
| Ca | 400–900 |
| Na | 7.7–15.3 |
| V | 0.2–0.9 |
| Ni | 11.2–17.9 |
| Mn | 13.1 |
| K | 181–935 |
| Mg | 1.1–25.2 |

In a typical experiment, dilute aqueous mineral or organic acid (0.35 to 35% concentration) was added to the oil at a treat rate of 8 to 30,000 ppm and thoroughly mixed for 10 minutes using a Waring blender or a Silverson homogenizer. Solid particles were added followed by mixing. After acid pretreatment was completed, water was added to the oil in small aliquots with mixing, which resulted in a solids-stabilized water-in-oil emulsion.

Emulsions prepared by oil pretreatment with dilute aqueous acid were subjected to the following tests:
1. Shelf stability at 25° C. for 48 hours
2. Optical microscopy and/or Nuclear Magnetic Resonance (NMR) for determination of water droplet size/size distribution
3. Microcentrifuge test—emulsion stability to centrifugation (as described in Appendix-1)
4. Emulsion stability—flow through a sand pack (this micropercolation test is described in Appendix-1)
5. Emulsion rheology using a Brookfield viscometer (cone(#5 1) and plate configuration) at 60° C. in a shear range of 1.92 to 384 sec$^{-1}$.

Test results for Crude Oil #2 using hydrochloric acid and sulfuric acid pretreatment are presented in Tables 3–6. Results for Crude Oil #4 using sulfuric acid and acetic acid pretreatment are presented in Table 7.

Example 1
Hydrochloric Acid Pretreatment of Crude Oil #2

Crude Oil #2 was used to prepare a 60/40 water-in-oil emulsion with 0.15 wt % hydrophobic silica, Aerosil® R 972, but without acid pretreatment. As shown in Table 3, the solids-stabilized emulsion was shelf stable, however, the emulsion was unstable in the microcentrifuge and micropercolation tests as evidenced by the high water (brine) breakout (%bbo). Dispersed water droplets ranged in the size from 1 to 10 microns in diameter.

The effect of hydrochloric acid pretreatment on the stability of the solids-stabilized emulsion was then tested. Crude Oil #2 was used to prepare a 60/40 solids-stabilized water-in-oil emulsion. However, in this example, the oil was pretreated with hydrochloric acid at a rate of 38,000 ppm followed by addition of 0.15 wt % of Aerosil® R 972. Dispersed water droplets ranged in size from 1 to 2 microns in diameter. As shown in Table 3, the hydrochloric acid pretreatment resulted in enhanced microcentrifuge and micropercolation stability and therefore enhanced emulsion stability as indicated by the decreased amount of water breakout in both tests.

TABLE 3

Pretreatment of Crude Oil #2 With Hydrochloric Acid
Pretreat Procedure: 38,000 ppm HCl added to crude and mixed using Waring Blender for 10 min.

| HCl ppm | Crude/ Water | Solid particles (Aerosil ® R972) (wt %) | Shelf Stability (2 days) | Droplet diameter (microns) | Micro-centrifuge (% bbo) | Micro-percolation (% bbo) |
|---|---|---|---|---|---|---|
| 0 | 40/60 | 0.15 | stable | 10 to 1 | 18 | 35 |
| 38,000 | 40/60 | 0.0 | stable | 10 to 1 | 0 | 20 |
| 38,000 | 40/60 | 0.15 | stable | 2 to 1 | 0 | 5 |
| 38,000 | 33/66 | 0.15 | stable | 2 to 1 | 0 | 4 | bbo :: brine (water) breakout in microcentrifuge test using Ottawa sand

Example-2

Sulfuric Acid Pretreatment of Crude Oil #2

Crude Oil #2 was used to make a 60/40 water-in-oil emulsion containing 0.15 wt % of Aerosil® R 972 with no acid pretreatment. As shown in Table 4, this emulsion, though shelf-stable, was unstable in the microcentrifuge and micropercolation tests. Dispersed water droplets ranged in size from 1 to 10 microns in diameter.

A 60/40 water-in-crude oil emulsion was made with sulfuric acid pretreatment of Crude Oil #2, but without the addition of solids. The sulfuric acid was added at a rate of 8750 ppm, based on the weight of the oil. The resulting emulsion was very unstable in the microcentrifuge and micropercolation tests.

A 60/40 water-in-crude oil emulsion was prepared with sulfuric acid pretreatment of Crude Oil #2 at a rate of 8750 ppm, based on the weight of the oil, with 0.15 wt % of Aerosil® R 972. As shown in Table 4, this procedure resulted in a stable emulsion. Dispersed water droplets ranged in size from 1 to 2 microns in diameter. The pH of the resultant emulsion was 1.2. The sulfuric acid pretreatment of oil resulted in enhanced microcentrifuge and micropercolation stability as indicated by the decreased amount of water or brine breakout (%bbo).

A 60/40 water-in-crude oil emulsion was prepared with sulfuric acid pretreatment of Crude Oil #2 at a treat rate of 8750 ppm, based on the weight of the oil followed by addition of 0.15 wt % of a hydrophilic silica, Aerosil® 300 (product of DeGussa Corp.). This procedure did not provide a stable water-in-oil emulsion, as the emulsion had increased water breakout in the microcentrifuge and micropercolation tests. The poor performance of the hydrophilic silica, Aerosil® 300, suggests that hydrophobic solids, in general, are required for the formation of stable emulsions using dilute acid pretreatment.

TABLE 4

Pretreatment of Crude Oil #2 With Sulfuric Acid
Pretreat Proc: 8750 ppm H₂SO₄ added to crude & mixed using Waring Blender for 10 min.

| $H_2SO_4$ ppm | Oil/ Water | Solid particles (Aerosil ® R972) (wt %) | Shelf Stability (2 days) | Droplet diameter (microns) | Micro-centrifuge (% bbo) | Micro-percolation (% bbo) |
|---|---|---|---|---|---|---|
| 0 | 40/60 | 0.15 | stable | 10 to 1 | 18 | 35 |
| 8750 | 40/60 | 0.0 | stable | 10 to 1 | 20 | 91 |
| 8750 | 40/60 | 0.15 | stable | 2 to 1 | 0 | 0 |
| 8750 | 33/66 | 0.15 | stable | 2 to 1 | 1 | 2 |
| 8750 | 40/60 | 0.10 | stable | 2 to 1 | 0 | 0 |
| 8750 | 40/60 | 0.075 | stable | 2 to 1 | 0 | 0 | bbo :: brine (water) breakout in micropercolation test using Ottawa sand

Example-3

Increasing the Water Content of Sulfuric Acid Pretreated Crude Oil #2

As shown in Table 5, about 70 wt % water could be incorporated into the resulting solids-stabilized water-in-oil emulsion made by pretreating Crude Oil #2 with sulfuric acid. Above about 72 wt % water, an increase in water droplet size was ed. Above about 80 wt % water, the emulsion phase separated as an emulsion and excess water. The rheological measurements show that the viscosity of the emulsions increased with an increase in the water content of the emulsion.

TABLE 5

Effect of Increasing the Water Content of
Sulfuric Acid Pretreated Crude Oil #2 Emulsion

| % water | Shelf stability | Micro-centrifuge (% bbo) | Micro-percolation (% bbo) | Droplet diameter (microns) | Viscosity 35 C., 9.6 s⁻¹ |
|---|---|---|---|---|---|
| 60 | yes | 0 | 0 | <2 | 15,400 |
| 65.5 | yes | 0 | 0 | <2 | |

TABLE 5-continued

Effect of Increasing the Water Content of
Sulfuric Acid Pretreated Crude Oil #2 Emulsion

| % water | Shelf stability | Micro-centrifuge (% bbo) | Micro-percolation (% bbo) | Droplet diameter (microns) | Viscosity 35 C., 9.6 s$^{-1}$ |
|---|---|---|---|---|---|
| 69.2 | yes | 0 | 0 | <2 | 20,152 |
| 71.4 | yes | 0 | 0 | <2 | 27,852 |
| 75 | yes | 0 | 5 | <2–5 | 26,214 |
| 80 | yes | 0 | 10 | <2–10 | 15,888 |
| 85 | phase separates as emulsion & excess water | | | | |

Note:
Solids: 0.15 wt % Aerosil ® R 972 Silica
bbo :: brine (water) breakout in micropercolation test using Ottawa sand
Sulfuric acid treat rate: 8750 ppm

Example-4

Decreasing the Solids Content of a 60/40 Water-in-Crude Oil #2 Emulsion

As shown in Table 6, stable emulsions were prepared with the hydrophobic silica, Aerosil® R 972, ranging in concentration from 0.025 wt % to 0.15 wt %. The viscosity of the emulsions decreased with decreasing solids content.

TABLE 6

Effect of Decreasing the Solids Content of
Sulfuric Acid Pretreated Crude Oil #2 Emulsion

| % Solid particles (Aerosil ® R972) | Shelf stability | Micro-centrifuge (% bbo) | Micro-percolation (% bbo) | Droplet diameter (microns) | viscosity 35 C., 9.6 s$^{-1}$ |
|---|---|---|---|---|---|
| 0.15 | yes | 0 | 0 | <2 | 15400 |
| 0.1 | yes | 0 | 0 | <2 | 7864 |
| 0.075 | yes | 0 | 0 | <2 | 7536 |
| 0.05 | yes | 0 | 0 | <2 | 8192 |
| 0.025 | yes | 0 | 0 | <2–5 | 6389 |

Note:
Oil/Water ratio = 40/60
bbo :: brine (water) breakout in micropercolation test using Ottawa sand
Sulfuric acid treat rate: 8750 ppm

Example-5

Sulfuric and Acetic Acid Pretreatment of Crude Oil #4

Similar to the results on Crude Oil #2, acid pretreatment of Crude Oil #4 resulted in enhanced stability of the resulting solids-stabilized emulsions. As the data in Table 7 indicate, pretreatment of the Crude Oil #4 with sulfuric acid at a rate of 8750 ppm, based on the weight of oil, followed by addition of 0.15 wt % Aerosilφ R 972 resulted in a stable emulsion.

Pretreatment of Crude Oil #4 with acetic acid at a treat rate of 24,500 ppm followed by addition of 0.15 wt % Aerosil® R 972 also resulted in a stable solids-stabilized 60/40 water-in-oil emulsion. The viscosity of the acetic acid treated emulsion was observed to be lower than the sulfuric acid treated counterpart, suggesting the nature of the acidifying agent could influence emulsion viscosity.

TABLE 7

Acid Pretreatment of Crude Oil #4

| Acid | % Solids (Aerosil ® R972) | Shelf stability | Micro-centrifuge (% bbo) | Micro-percolation (% bbo) | Droplet diameter (microns) | viscosity 60 C., 9.6 S$^{-1}$ |
|---|---|---|---|---|---|---|
| None | 0.15 | yes | 0 | 9 | <2–10 | 5240 |
| Sulfuric | 0.15 | yes | 0 | 3.5 | <2 | 2948 |
| Acetic | 0.15 | yes | 0 | 0 | <2 | 4095 |

Note:
Viscosity of Crude Oil #4 = 164 cP @ 60 C., 9.6 s$^{-1}$
bbo :: brine (water) breakout in micropercolation test using Ottawa sand
Sulfuric acid treat rate: 8750 ppm
Acetic acid treat rate: 24,500 ppm

Example-6

Adjusting the pH of the Acid Treated Emulsion

Two approaches are described to produce water-in-oil emulsions in the preferred pH range of 5 to 7:
a) Neutralization of the preformed acid treated oil emulsion with the appropriate amount of base Neutralization of the acid pretreated oil with ammonium hydroxide before or after addition of water is the preferred method to increase the emulsion pH. In contrast, neutralization of the emulsion with sodium hydroxide or calcium oxide results in destabilization of the emulsion. As previously noted, a possible explanation for this effect is that ammonium hydroxide is a weaker base than sodium hydroxide or calcium oxide. Strong bases tend to invert the emulsion, i.e. convert the water-in-oil emulsion to an oil-in-water emulsion. Such an inversion is undesirable for the process of this invention.
b) Reducing the Acid Treat Rate to Levels Just Enough to Neutralize the Basic Components of the Oil Another approach to obtaining an emulsion in the pH range of 5–7 is to reduce the acid treat rate to levels just enough to neutralize the basic components of the oil. Acids used in this experiment were hydrochloric, sulfuric and acetic acids. For Crude Oil #2 and Crude Oil #4, it was found that an acid treat rate of 8.7 ppm was adequate to produce the required emulsions at a pH of 5.5 to 6.5. A summary of emulsion properties for Crude Oil #4 pretreated with 8.75 ppm sulfuric acid is given in Table 8.

TABLE 8

Summary of Emulsion Properties of a Water-in-Oil Emulsion Prepared by Pretreatment of Crude Oil #4 with 8.75 ppm Sulfuric Acid Emulsion Properties:

| | |
|---|---|
| Crude: | 40 wt % |
| Water: | 60 wt % |
| Hydrophobic Silica (R 972): | 0.15 wt % |
| Water Droplet Size (Mean Diameter): | 6 microns |
| Shelf Stability: | >2 weeks |
| Stability to Centrifugation: | 0% water breakout |
| Stability to Percolation through Berea sand: | 16% water breakout |
| Viscosity: | 3700 cP @ 60 C., 9.6 sec$^{-1}$ |
| pH: | 6.2 |

Example-8

Gas Addition for Viscosity Reduction of Water-in-Oil Emulsions

Addition of $CO_2$ to the acid pretreated oil emulsion is effective in reducing the viscosity of the emulsion. Experiments have been conducted on emulsions made from Crude Oil #2 pretreated with 8700 ppm sulfuric acid and 0.15 wt % Aerosil® R 972

Results shown in Table-9 reveal that at 500 psi pressure and the corresponding reservoir temperature, emulsion viscosity reduction is feasible using carbon dioxide gas. Other gases like ethane and propane can also lower emulsion viscosity

TABLE 9

Influence of $CO_2$ on an Acid Pretreated Solids-Stabilized Water-in-Crude Oil Emulsion

| | | VISCOSITY (cP) at 10 sec$^{-1}$ | |
|---|---|---|---|
| Emulsion | Temp (° C.) | Viscosity (cP) Without $CO_2$ | At 10 sec$^{-1}$ with 500 psi $CO_2$ |
| Crude Oil #2 | 35 | 11213 | 1671 |

Pretreatment of Oil by Sulfonation Chemistry

Another method for pretreating oil to enhance its ability to make a solids-stabilized water-in-oil emulsion is to pretreat the oil with a sulfonating agent prior to emulsification. The sulfonation procedure can result in chemical modifications to the oil and to the surface of the solids. For example, (1) the sulfonation procedure herein described creates sulfur-functionalized components of oil, and these components are surface active and aid the formation of the water-in-oil emulsion; (2) If naphthenic acids are present in the oil, sulfonation will markedly enhance their acidity and interfacial activity through the chemically attached sulfonate groups; (3) The sulfonate groups from the sulfonating agent will also functionalize the surface of the solids and thus modify the solids' surface to improve its interaction with the surface-active components of oil (preexistent in the oil or generated from the sulfonation reaction); and (4) The basic nitrogen containing components of oil are converted to the corresponding sulfonates and/or sulfate salts. These salts are more surface-active than the base nitrogen containing components themselves and thus contribute to improving the stability of the solids-stabilized water-in-oil emulsion.

Procedure for Preparation of a Solids-Stabilized Water-in-Oil Emulsion Using Sulfonation Chemistry The oil is pretreated with a sulfonating agent either before or after the addition of solid particles, and followed by the addition of water. The water is added in small aliquots or continuously and the mixture subjected to shear mixing, preferably between 1000 to 12000 rpm, for a time sufficient to disperse the water as small droplets in the continuous oil phase, typically between 0.5 to 24 hours. It is preferred to have a water concentration in the water-in-oil emulsion of 40 to 80%, more preferably 50 to 65%, and most preferably 60%.

The preferred sulfonating agent is concentrated sulfuric acid. The preferred treat rate of sulfuric acid to oil is between 0.5 to 5 wt %, more preferably 1 to 3 wt %, based on the weight of oil. Other sulfonating agents can be used alone or in combination with other agents. Such sulfonating agents are generally described in E. E. Gilbert, *Sulfonation and Related Reactions, Interscience*, New York, (1965). Other common sulfonating agents that may be useful in the present invention include fuming sulfuric acid, sulfur trioxide, alkali disulfates, pyrosulfates, chlorosulfonic acid and a mixture of manganese dioxide and sulfurous acid. The process temperature during sulfonation can be from −20° C. to 300° C., preferably from 10° C. to 100° C. and more preferably from 20° C. to 60° C. Reaction can be accelerated by various methods, including without limitation thermal, mechanical, sonic, electromagnetic, vibrational, mixing, and spraying.

As can be appreciated by one of ordinary skill in the art, the amount of sulfonating agent useful in the present invention can be adjusted according especially to the nature of the sulfonating agent, and the asphaltene and resin content of the oils. An oil containing a large amount of asphaltene may require less sulfonation than one containing a small amount of asphaltene. The amount of asphaltene in oil can be determined using standard techniques known in the art. The range of sulfonation can be from 0.01 to 40%, preferably from 0.1 to 10% and more preferably from 0.1 to 2% of the mass of the solid particles.

One method for practicing this embodiment of the invention is to first sulfonate the oil, and then add the solid particles. However, addition of the solid particles to the oil and sulfonation of the mixture is preferred. The solids can be silica, clays, hydrophobic particulates, and/or unfunctionalized and functionalized asphalts and their corresponding mixtures. The preferred treat rate of the solids to the oil is 0.05 to 2.0 wt % solids based on the weight of oil.

The hydrophobic particulates for this embodiment of the invention are any particulate wherein the hydrophobicity is greater than 50% and less than 99.9% and hydrophilic or polar moieties are less than 40% and greater than 0.1% of the particulate mass. The hydrophilic or polar moieties can be formed as a result of sulfonation of the combination of hydrophobic particulates with oil. Examples of hydrophobic particulates useful for this invention include, without limitation, phylosilicates, lignin, lignite, coal, gillsonite, silica, dolamite, metaloyides, layered oxides, and quaternary onium exchanged phylosilicates.

Functionalized and unfunctionalized asphalts are also effective solids for making the sulfonate-pretreated solids-stabilized water-in-oil emulsions. In particular, phosphonated asphalt that has been sufficiently immersed in the oil, preferably for 24 hours at 55° C., is an effective solid. The asphalts can be used in their natural state or may be functionalized or functionalized by sulfonation agents of the present invention. Nonlimiting examples of functional moieties are sulfonic acid, phosphoric acid, carboxylic acid, nitric acid or salts thereof, and hydrophilic groups.

After emulsion preparation, the pH of the emulsion can be adjusted as previously described in connection with the first embodiment of the invention related to pretreating oil with dilute acid. As previously described, a calculated amount of weak base is added to the emulsion and the emulsion is subjected to shear mixing for a time sufficient to raise its pH to the desired level, preferably in the 5–7 range. Adjusting pH is optional, as in some cases it is desirable to inject an acidic emulsion and allow the reservoir formation to buffer the emulsion to the reservoir alkalinity.

The viscosity of the emulsion increases with sulfonation. However, the emulsion viscosity is not a linear function of sulfonating agent addition. The viscosity of the emulsion increases at a reduced rate as a function of sulfonation. Therefore, the user may make increasingly stable solids-stabilized emulsions via sulfonation, while maintaining desirable Theological properties. Further, the viscosity of the emulsion may also be reduced by the addition of gas as discussed in U.S. Pat. Nos. 5,855,243 and 5,910,467.

While sulfonation of the entire quantity of oil necessary to make such an emulsion is feasible, it is also possible to sulfonate a slipstream or master batch of oil and subsequently mix the slipstream with a main stream of oil prior to water addition and emulsification. This main stream of oil is preferably untreated crude oil, however, it may be any oil, including oil that has been treated to enhance its ability to form a stable emulsion or treated to optimize its rheology. If this slipstream method is used, the amounts of solids and sulfonating agent needed for the slipstream treatment are scaled accordingly to obtain the desired amounts in the resulting emulsion.

EXAMPLES

This embodiment of the invention has been demonstrated using Crude Oil #2 and another oil, Crude Oil #5, as these oils do not form stable solids-stabilized emulsions using the method described in U.S. Pat. Nos. 5,927,404, 5,855,243 and 5,910,467. However, as indicated by the experiments below, pretreating the oil with sulfonation chemistry improves the oil's ability to form stable solids-stabilized water-in-oil emulsions.

In a typical experiment, the solid particles are added to oil and then sulfonated. Concentrated sulfuric acid is used as the sulfonating agent, and is added at a treat rate of 3 parts of acid per 100 parts of oil. This mixture is stirred on a hot plate with a magnetic stirrer attachment at a temperature of around 50° C. Water is then added to the oil in small aliquots with mixing, which results in a solids-stabilized water-in-oil emulsion.

These emulsions were subjected to the following tests:
1. Shelf stability at 25° C. for 48 hours
2. Optical microscopy and NMR for determination of water droplet size/size distribution
3. Centrifuge stability (described in Appendix-1)
4. Emulsion stability: flow through a sand pack (the micropercolation test procedure is given in Appendix-1)

Example 1

Crude Oil #2 and solid particulates were co-sulfonated as follows: 12 grams (g) of Crude Oil #2 and the solid particles, comprised of 0.06 g of 2-methylbenzyl tallow intercalated monomorillonite (Organotrol® 1665; product of Cimar Corp.) and 0.12 g ASP-97-021 untreated Billings asphalt (product of Exxon), were combined in a glass jar. The mixture was stirred at 50° C. for 72 hours. Sulfuric acid was added at 3 parts acid per 100 parts oil and the mixture stirred at 50° C. for 24 hours.

The sulfonated oil and solids were then combined with 18 g of synthetic brine solution (comprised of 9.4 g sodium chloride, 3.3 g $CaCl_2$ (calcium chloride).$2H_2O$, 0.48 $MgCl_2$ (magnesium chloride).$6H_2O$ and 0.16 g potassium chloride per liter of distilled water). The brine was added dropwise over 30 minutes at 5000 rpm. The emulsion thus formed was mixed for an additional 15 minutes at 7500 rpm.

The oil external solids-stabilized emulsion thus produced was tested for stability using the micropercolation test as described in Appendix-1. The sand used in this test was Ottawa sand and the oil was centrifuged with the sand for one minute at 50° C. Duplicate samples showed 0% and 3.2% brine breakout (%bbo) following injection through the sand pack. Light microscopy showed water droplet diameter less than 20 microns and a majority of particles having diameters less than 7 microns.

Example 2

Crude Oil #5 and oxidized asphalt (OX-97-29-180; product of Imperial Oil) were co-sulfonated according to the previously described procedure. However, in this example the oil and asphalt were stirred together for 2.5 hours at 50° C. prior to the addition of the sulfonating agent, sulfuric acid at 3 parts sulfuric acid per 100 parts oil.

The sulfonated product was mixed with the synthetic brine solution as described. The resultant mixture contained 60% aqueous phase content. This oil external emulsion exhibited a pH of 1.6 and was then neutralized to a pH of 7.3 with the addition of ammonium hydroxide and then remixed on an Arrow 850 mixer at 350 rpm for 15 minutes. The emulsion pH approximated the pH of Crude Oil #5. This emulsion showed no brine breakout in the micropercolation test. Droplet diameters were less than 10 microns with the majority of water droplets less than 5 microns. Rheological testing using a cone and plate viscometer demonstrated high emulsion stability, i.e. the viscosity remained essentially constant as a function of cycle number.

Example 3

The same experiment was performed using Crude Oil #5 and 2-methylbenzyl tallow intercalated montmorillonite (Organotrol® 1665, a product of Cimbar Performance Minerals, Cartersville Ga.) as the solid particulate. The crude oil and solid particles were combined and stirred for 4 hours at 50° C. prior to the addition of sulfuric acid. Otherwise, this mixture was sulfonated according to the methods described above.

The synthetic brine solution described above was added to the oil and solids and mixed as before. The resulting emulsion's pH level was also adjusted to 7.5 with the addition of ammonium hydroxide and mixing with an Arrow 850® mixer at 350 rpm for 15 minutes. The oil external emulsion exhibited an aqueous phase droplet diameter of less than 10 microns and a majority of brine droplets were less than 5 microns. No brine breakout was found under the micropercolation test described in Appendix-1, using Berea sand.

Example 4

Crude Oil #2 and untreated asphalt (ASP-97-021, a product of Imperial Oil Corporation, Canada) were co-sulfonated. The oil and asphalt were stirred at 50° C. for 72 hours prior to the addition of the sulfuric acid. Otherwise, sulfonation was performed by the steps described above.

The solids-stabilized water-in-oil emulsion was produced with the addition of the synthetic brine solution described above and mixing according to the procedures above. However, in this example, the emulsion pH was not adjusted, but remained acidic. Light microscopy showed an aqueous phase droplet diameter less than 10 microns with a majority of droplets less than 5 microns. No brine breakout was found by the micropercolation test described in Appendix-1, using Ottawa sand.

Example 5

12 g of Crude Oil #2 and 0.06 g of an hydrophobic particulate, Wolastafil-050-MH-0010® (methylalkoxysilane coated calcium metasilicate having a 1% coating by weight of calcium metasilicate—product of United Mineral Corp.), were co-sulfonated as previously described. In this example, the oil and particulate were stirred at 50° C. for 2.5 hours prior to the addition of the sulfuric acid.

A solids-stabilized water-in-oil emulsion was produced by the above described procedures, and the emulsion pH was adjusted to 6.1 using ammonium hydroxide. Light microscopy revealed an aqueous phase droplet diameter of less than 5 microns. The result of the micropercolation test demonstrated no brine breakout following emulsion injection. Rheological testing showed no significant change in viscosity with cycle number indicating high shear stability.

Example 6

A solids-stabilized water-in-oil emulsion was formed using Crude Oil #2 and phosphonated asphalt (Kew 97-149®, a product of Imperial Oil Corporation, Canada) as the solid particles. The oil and solids were added together and the mixture was stirred at 50° C. for 48 hours prior to the addition of sulfuric acid, as described above.

The resulting water-in-oil emulsion showed aqueous phase droplet diameter less than 5 microns using light microscopy. The micropercolation test revealed no brine breakout. Rheological testing indicated high emulsion stability, i.e. the viscosity remained essentially constant as a function of the number of cycles.

Pretreatment of Oil with Lignosulfonate Additive

Another method of pretreating oil to enhance its ability to form a stabile solids-stabilized water-in-oil emulsion is to add a lignosulfonate additive to the oil prior to making the emulsion. The salts of lignosulfonic acid (e.g., sodium, potassium, ammonium, calcium, etc.) are surface-active in nature, and when added to an oil/water mixture they will tend to aggregate at the oil/water interface. This effect increases the interfacial activity of the oil and enhances the stability of the emulsion.

Preparation of the Lignosulfonate Treated Solids-Stabilized Emulsion

To practice this embodiment of the invention, a lignosulfonate additive is added to oil, before or after the addition of the solid particles, but prior to emulsification. For the sake of simplicity and clarity, this specification shall reference adding one type of lignosulfonate additive to the oil. However, it should be understood that combinations of different lignosulfonate additives may be used to practice this embodiment of the invention. The lignosulfonate additive is added at a treat rate of between 200 to 20,000 ppm based on the weight of the oil, more preferably 500 to 5000 ppm, and even more preferably 500 to 1000 ppm, for 5 to 10 minutes at 25 to 40° C. The solid particles are added either before or after lignosulfonate additive addition, followed by the addition of water in small aliquots or continuously. The mixture is then subjected to shear mixing at a rate of between 1000 to 12000 rpm for a time sufficient to disperse the water as small droplets in the continuous oil phase. It is preferred to have a water concentration in the water-in-oil emulsion of 40 to 80%, more preferably 50 to 65%, and most preferably 60%.

The temperature of the emulsion will rise above ambient temperature (25° C.) during mixing. Controlling the temperature of the emulsion during mixing is not critical, however, higher temperatures between 40° C. and 75° C. are preferred.

Both oil soluble and water-soluble lignosulfonate additives can be used to enhance the stability of the solids-stabilized water-in-oil emulsion. Non-limiting examples of water-soluble lignosulfonates are sulfonate salts of monovalent cations like sodium, potassium, and ammonium. Non-limiting examples of oil soluble lignosulfonates are sulfonate salts of divalent cations like calcium, magnesium, and iron. It is preferred to use water-soluble additives because of the ease of delivery and the use of water as the delivery solvent. The preferred water-soluble lignosulfonate additive is ammonium lignosulfonate. In addition, mixtures of lignosulfonate salts may be used to produce the same or an enhanced effect.

A hydrophobic silica, Aerosil® R 972, was found to be an effective solid for several types of oil. The invention has been demonstrated using Aerosil® R-972 at a treat rate of 0.15 wt %, based on the weight of the oil. Other hydrophobic solids like divided and oil wetted bentonite clays, organophilic clays or carbonaceous asphaltenic solids may also be used. Hydrophilic solid particles can also be used. The preferred treat rate for solids is 0.05 to 0.25 wt % based on the weight of the oil.

One may first pretreat the oil with the lignosulfonate additive and then add the solid particulates. However, it is preferred to add the solid particulates to the oil and then add the lignosulfonate additive to the mixture. Optionally, the solid particulates can be first treated with the lignosulfonate additive and the treated solids can be added to the oil prior to the addition of water and mixing. As aforementioned, either water or oil soluble lignosulfonate additives can be used to pretreat the solids. The choice of which type of lignosulfonate additive to use depends upon the type of solid to be treated. Generally, a hydrophobic solid is treated with a water soluble lignosulfonate additive and a hydrophilic solid with an oil soluble lignosulfonate additive. Such a choice would enable suitable modification of the solids' surface to render optimum hydrophilic and hydrophobic character.

While lignosulfonate pretreatment of the entire quantity of oil necessary to make a desired emulsion is feasible by this embodiment of the invention, it is also possible to pretreat a slipstream or master batch of oil and subsequently mix the slipstream with a main stream of oil prior to water addition and emulsification. This main stream of oil is preferably untreated crude oil, however, it may be any oil, including oil that has been treated to enhance its ability to form a stable emulsion or treated to optimize its rheology. If this slipstream method is used, the amounts of solids and lignosulfonate additives needed for the slipstream treatment are scaled accordingly to obtain the desired amounts in the resulting emulsion.

This embodiment of the invention can be used in conjunction with the method of pretreating oil with dilute mineral or organic acid to further enhance the surface-active properties in the oil. The dilute acid addition can occur before or after lignosulfonate addition, as the order of addition of the acid and the lignosulfonate additive are not critical. However, the acid addition and the lignosulfonate addition should occur prior to emulsification. If the lignosulfonate addition is combined with acid addition, the pH of the emulsion can be adjusted by adding a calculated amount of a weak base, as previously described, to raise the pH to the desired level, preferably to a pH of between 5–7.

EXAMPLES

This invention has been demonstrated on Crude Oil #4 and Crude Oil #6, as these crude oils do not form stable solids-stabilized emulsions using the method described in U.S. Pat. Nos. 5,927,404, 5,855,243 and 5,910,467. Crude Oil #6 is a low viscosity crude oil. In a typical experiment, the lignosulfonate additive was added to the oil at a treat rate of 0.05 to 0.5 wt % based on the weight of the oil and mixed for 10 minutes using a Silverson® homogenizer at from about 1000 to 12,000 rpm. Ammonium lignosulfonate and calcium lignosulfonate were used as the lignosulfonate additives in these examples. Solid particles, either divided bentonite or hydrophilic silica, were added at 0.15 wt % based on the weight of the oil, followed by further mixing. Water was then added to the mixture in small aliquots with further mixing to provide a solids-stabilized water-in-oil emulsion.

Emulsions prepared by the foregoing methods were subjected to the following tests:
1. Shelf stability at 25° C. for 48 hours
2. Optical microscopy and NMR for determination of water droplet size/size distribution
3. Centrifuge stability (see Appendix-1)
4. Emulsion stability: flow through a sand pack (details of the micropercolation test procedure is given in Appendix-1)
5. Emulsion rheology using a Brookfield® viscometer (cone (#51) and plate configuration) at 60° C. in a shear range of 1.92 to 384 $sec^{-1}$.

Example-1

Crude Oil #4

Test results for Crude Oil #4 pretreated with ammonium lignosulfonate or calcium lignosulfonate are presented in Table 10. A solids-stabilized 60/40 water-in-oil emulsion was formed using lignosulfonate pretreatment at 0.5 wt % and a hydrophobic silica, Aerosil® R 972, at 0.15 wt %.

As indicated in Table 10, the lignosulfonate pretreatment enhanced the stability of the emulsions as evidenced by the decreased brine breakout (%bbo) under the micropercolation test, as compared to the untreated solids-stabilized water-in-oil emulsion.

TABLE 10

Influence of 0.5 wt % ammonium and calcium lignosulfonate on a solids-stabilized water-in-oil emulsion made from Crude Oil #4

| Lignosulfonate Additive | Micropercolation Stability (% bbo) | Emulsion Viscosity (cP) at 60° C. |
| --- | --- | --- |
| None | 38 | 2743 |
| Ammonium Lignosulfonate | 4 | 2620 |
| Calcium Lignosulfonate | 8 | 2620 |

Example-2

Crude Oil #6

A solids-stabilized 60/40 water-in-oil emulsion was made with Crude Oil #6 and 0.15 wt % hydrophobic silica, Aerosil® R 972. No lignosulfonate pretreatment was used. The emulsion was unstable with a 40% water breakout under the micropercolation test. The viscosity of the emulsion at 60° C. and 9.6 $sec^{-1}$ was 983 cP.

However, when the same 60/40 water-in-oil emulsion was prepared using Crude Oil #6 pretreated with 0.5 wt % ammonium lignosulfonate, the stability of the emulsion was enhanced, with the water breakout reduced to 17%. The viscosity of the emulsion at 60° C. and 9.6 $sec^{-1}$ increased slightly to 1064 cP.

Example-3

50/50 Crude Oil Blend using Crude Oil #4 and Crude Oil #6

An untreated solids-stabilized 60/40 water-in-oil emulsion was prepared using a 50% Crude Oil #4 and 50% Crude Oil #6 blend. The solid particles were comprised of a hydrophobic silica, Aerosil® R 972, at 0.15 wt % based upon the weight of the oil blend. The untreated solids-stabilized emulsion had a water breakout of 32%. Viscosity for this emulsion at 60° C. and 9.6 $sec^{-1}$ was 2129 cP.

The same emulsion was prepared with a 50/50 Crude Oil #4/Crude Oil #6 blend that was pretreated with 0.5 wt % of ammonium lignosulfonate. The lignosulfonate treated solids-stabilized emulsion showed enhanced stability as evidenced by the decrease in brine breakout to 5%. The viscosity of the treated emulsion at 60° C. and 9.6 $sec^{-1}$ remained at 2129 cP. The data indicate that the treatment enhanced emulsion stability with no change in the viscosity.

Pretreatment of Oil by Thermal Air Oxidation

Another pretreatment embodiment that can be used to increase the stability of a solids-stabilized water-in-oil emulsion is to thermally treat the oil, either before or after the addition of solid particles, in the presence of air or oxygen.

Thermally treating oil or a mixture of oil and solid particles in the presence of air or oxygen causes various reactions to occur in the oil and on the surface of the solid particles. (1) The aromatic components of the oil that have benzyllic carbons and those that have fused rings that are oxidizable including, but not limited to naphthelene and anthracene, are oxidized to the corresponding acids, ketones or quinone products. Organo sulfur and nitrogen compounds present are oxidized to sulfoxides and nitrogen oxides. The oxygenated compounds are more surface-active than the aromatic components themselves and adsorb strongly on the surface of the solid particles to improve the stability of the solids-stabilized water-in-oil emulsion. (2) If naphthenic acids are present as salts of divalent cations like calcium, air oxidation can convert these salts to naphthenic acids and the corresponding metal oxide, for example calcium oxide. The free napthenic acid can adsorb on the surface of the solids and also improve the stability of the solids-stabilized water-in-oil emulsion. (3) Thermal treatment with an air purge dehydrates the solid particles and thus modifies the solids' surface to improve its interaction with the surface-active components of oil (preexistent in the oil or generated from air oxidation).

Preparation of a Solids-Stabilized Emulsion Using Thermal Air Oxidized Oil

To prepare a solids-stabilized water-in-oil emulsion using this method, the oil is thermally treated for sufficient time and temperature in the presence of an air or oxygen purge to enable the physical and chemical modifications to the oil and solid particles. Preferably, the oil is heated to temperatures of between 110–180° C. for 15 minutes to 6 hours, under an air or oxygen purge at a preferred rate of 20 to 100 standard cubic feet per barrel per hour (scf/bbl/hr).

The solid particles may be added before, during or after the thermal air oxidation step, but should be added before emulsification. However, it is preferred to add the solids to the oil and then thermally air oxidize the mixture. The solid particles may be hydrophilic or hydrophobic in nature. Fumed silica, sold under the trade name of Aerosil® R 972 or Aerosil® 130 (Products of DeGussa Corp.) were found to be effective solids for a number of oils. Other solid particles like bentonite clays, divided bentonite clays, kaolinite clays, organophilic clays or carbonaceous asphaltenic solids may also be used.

The amount of solid particle added to the oil can vary in the range of about 1% to 90% based on the weight of the oil, preferably 0.01 to 20 wt %, and more preferably 0.05 to 5.0 wt %. At the higher concentrations, the mixture of solids and oil will be a high solids content slurry.

Bentonite clays, such as those mined in Wyoming, Ga., or other numerous locations around the world, are particularly suited as stabilizers for water-in-oil emulsions. As mined, these clays naturally consist of aggregates of particles that can be dispersed in water and broken up by shearing into units having average particle sizes of 2 microns or less. However, each of these particles is a laminated unit containing approximately 100 layers of fundamental silicate layers of 1 nm thickness bonded together by inclusions of atoms such as calcium in the layers. By exchanging the atoms such as calcium by sodium or lithium (which are larger and have strong attractions for water molecules in fresh water), and then exposing the bentonite to fresh water, the bentonite can be broken into individual 1 nm thick layers, called fundamental particles. The chemistry of this delamination process is well known to those skilled in the art of clay chemistry. The result of this delamination process is a gel consisting of divided bentonite clay.

The preferred solid is divided or delaminated bentonite clay that is obtained as a gel from the delamination process described above. The amount of gel added to the oil before the thermal air oxidation step can very in the range of 5 to 95% of gel based on the weight of the oil, preferably 40 to 60%. The weight of bentonite clay solids in the gel can very from 1 to 30% based on the weight of the water. When bentonite clay gel is used as the solid particle, and is added to the oil and subjected to the thermal air oxidation step, water is expelled from the reaction vessel as steam. The reaction should be carried out until at least 80% of the water is expelled, preferably until 95% of the water is expelled, and even more preferably until 100% of the water is expelled.

It is preferred to oxidize a slipstream or master batch of a mixture of oil and solids and subsequently mix the slipstream with a main stream of oil prior to water addition and mixing, i.e. prior to emulsification. This main stream of oil is preferably untreated crude oil, however, it may be any oil, including oil that has been treated to enhance its ability to form a stable emulsion or treated to optimize its rheology. If untreated crude oil is the main stream, the preferred blending rate is 0.5 to 5% oxidized oil in the untreated oil main stream, more preferably 0.1 to 2.5%.

After the air oxidation step and solid particle addition, water is added in small aliquots or continuously and the mixture is subjected to shear mixing at 1000 to 12000 rpm for a time sufficient to disperse the water as small droplets in the continuous oil phase. The temperature of the emulsion will rise above ambient temperature of 25° C. during mixing. Controlling the temperature of the emulsion during mixing is not critical. However, higher temperatures between 40 to 70° C. are preferred.

Catalysts may be used to enhance the oxidation reaction. Finely divided catalysts like iron, manganese or nickel, or their oil soluble metal salts can be used to catalyze oxidation rates and effect selectivity in the oxidation products. Such oxidation promoting catalysts and the techniques of using such catalysts are well known in the art, and therefore will not be discussed herein. Oxidation can be conducted at elevated pressures to further catalyze the reaction rate and achieve product selectivity, however, oxidation at ambient pressures is preferred.

The oxidized oil can be further treated with dilute mineral or organic acid to provide additional stability to the solids-stabilized water-in-oil emulsion. The preferred acid treat rate is between 8 and 30,000 ppm. If this acid pretreatment step is used, the pH of the resulting emulsion can be adjusted to a preferred range of 5 to 7 by adding a calculated amount of weak base to the emulsion. However, adjusting pH is optional as in some cases it is desirable to inject an acidic emulsion and allow the reservoir formation to buffer the emulsion to the reservoir alkalinity. Ammonium hydroxide is the preferred base for pH adjustment. Stronger bases like sodium hydroxide, potassium hydroxide and calcium oxide have a negative effect on emulsion stability. One possible explanation for this effect is that strong bases tend to invert the emulsion, i.e. convert the water-in-oil emulsion to an oil-in-water emulsion. Such an inversion is undesirable for the purposes of this invention.

In addition to increasing the stability of the solids-stabilized water-in-oil emulsion, dilute acid treatment lowers the viscosity of the emulsion. This reduced viscosity aids in enhancing the infectivity of the emulsion, and may also be beneficial in other aspects in EOR processes, for example, matching the emulsion's rheology with that of the subterranean oil to be recovered when using the emulsion as a drive fluid. Gas may also be added to further lower the viscosity of the emulsion.

EXAMPLES

In a typical experiment, 200 g of oil was placed in a Parr® autoclave or three-necked glass flasks and oxidized at temperatures of 150 to 160 ° C. for 2 to 6 hours with a continuous purge of air at 80 to 100 scf/bbl/hour. The oxidized oil was then blended to various ratios with untreated oil or other thermally air oxidized oils, as detailed in the specific examples below. A hydrophobic silica, Aerosil® R 972 was added to the oxidized oil blend at 0.05 to 0.15 wt %, based on the weight of the oil. After the solids addition, the product was mixed using a Silverson® homogenizer. Water was then added in small aliquots with mixing to produce the solids-stabilized water-in-oil emulsion.

For the preferred case of thermal air oxidation of a mixture of oil and divided bentonite gel, the oil and gel are first mixed to form a slurry. Air or oxygen gas is purged into the reactor and the temperature raised to between 150° C. and 170° C. The water is expelled as steam and can be condensed outside for recovery and reuse.

For the optional case of acid addition to the oxidized oil, 10 ppm of sulfuric acid was added to the oxidized sample and mixed for 10 minutes at 40° C. Addition of solids and water with mixing followed as described above.

Emulsions prepared by the foregoing methods were subjected to the following tests:

1. Shelf stability at 25° C. for 48 hours
2. Optical microscopy and NMR for determination of water droplet size/size distribution
3. Centrifuge stability (described in Appendix-1)
4. Emulsion stability: flow through a sand pack (details of the micropercolation test procedure is given in Appendix-1)
5. Emulsion rheology using a Brookfield® viscometer (cone(#51) and plate configuration) at 60° C. in a shear range of 1.92 to 384 sec$^{-1}$.

Example-1

Untreated Crude Oil #4 Blended with Air Oxidized Crude Oil #4

Aerosil® R 972 was added at a treat rate of 0.1 5 wt % to untreated Crude Oil #4, followed by water and mixing to form a 60/40 solids-stabilized water-in-crude oil emulsion. This emulsion, though shelf-stable, was unstable in the centrifuge and micropercolation tests. Dispersed water droplets ranged in size from 2 to 40 microns in diameter, and a 54% water breakout was observed in the micropercolation test described in Appendix-1, using Berea sand. The viscosity of the emulsion at 60° C. and 9.6 sec$^{-1}$ was 3644 cP.

Another batch of Crude Oil #4 was thermally air oxidized according to the procedure described above. The thermally air oxidized Crude Oil #4 was blended with untreated Crude Oil #4 at 2.5 wt % of treated oil in the untreated oil. Delivery of the thermally air oxidized Crude Oil #4 was in toluene in a 1:2 ratio. A hydrophobic silica, Aerosil® R 972, was added to the blend at 0.15 wt % based on the weight of the blended oil. Addition of water and mixing followed to make a 60/40 solids-stabilized water-in-crude oil solids-stabilized emulsion. NMR determined droplet size distribution indicates that 90% of the water droplets were less than 2 microns in diameter. The emulsion's stability improved over that of the untreated Crude Oil #4 solids-stabilized emulsion, as evidenced by a reduction to 10% water breakout in the Berea micropercolation test. The emulsion's viscosity was 2452 cP at 60° C. and 10 sec$^{-1}$. Additionally, the viscosity profiles repeated over a 1-hour shear cycle.

Ethane gas was added to reduce the thermally air oxidized solids-stabilized water-in-oil emulsion's viscosity. The resulting emulsion's viscosity was lowered from 2452 to 390 cP at 60° C. with saturation of ethane at 400 psi. The emulsion was stable to ethane addition and shearing at 10 sec$^{-1}$ for the duration of the experiment of 5 days.

Example-2

Blends of Oxidized Crude Oil #4 and Low Viscosity Crude Oil #6

In this experiment Crude Oil #4 and a low viscosity crude oil, Crude Oil #6, were blended to various ratios. A hydrophobic solid, Aerosil® R 972, was added at 0.15 wt % solids to the blended oil, along with 10 ppm sulfuric acid and mixed for 30 minutes. Water was then added in small aliquots and mixed to provide a 60/40 water-in-blended oil emulsion. Results are shown in Table 11. As is observed from the data, increasing the proportion of the low viscosity Crude Oil #6 decreases the viscosity of the 60/40 water-in-blended oil emulsion from 3644 cP (measured at 60° C. and 9.6 sec$^{-1}$) to 983 cP. However, the stability of the emulsions are poor as evidenced by the 30 to 40% water breakout in the micropercolation test using Berea sand.

TABLE 11

| Crude Oil #4/Crude Oil #6 Blend Ratio | % bbo | Viscosity, cP 60° C., 96 s$^{-1}$ |
|---|---|---|
| 100/0 | 38 | 3644 |
| 75/25 | 34 | 2621 |
| 50/50 | 32 | 2129 |
| 25/75 | 41 | 1638 |
| 0/100 | 40 | 983 |

Table 12 shows the effectiveness of thermal air oxidation of the oil before emulsification to enhance the stability of the resulting emulsion. Crude Oil #6 was thermally air oxidized by the method previously described and then blended with untreated Crude Oil #4 to result in a 75% untreated Crude Oil #4 to a 25% thermally air oxidized Crude Oil #6 blend. A hydrophobic solid, Aerosil® R 972, was added to the blend along with 10 ppm sulfuric acid, and mixed for 30 minutes. Water was then added in small aliquots and mixed to provide a 60/40 water-in-blended oil emulsion. Results shown in Table 12 illustrate the effectiveness of this method as indicated by the micropercolation test using Berea sand.

TABLE 12

| Oils | Brine Breakout (% bbo) | Viscosity. cP 60° C., 96 s$^{-1}$ |
|---|---|---|
| 75% Crude Oil #4 25% Crude Oil #6 | 34 | 2621 |
| 75% Crude Oil #4 25% Thermally Air Oxidized Crude Oil #6 | 16 | 2620 |

Upon addition of 25% of thermally air oxidized Crude Oil #6 to untreated Crude Oil #4, the stability of the emulsion doubles as evidenced by the decrease in percent brine breakout from 34% to 16%.

Example-3

Solids-Stabilized Emulsion Prepared Using Crude Oil #4 and Divided Bentonite Gel A mixture of 70 grams (g) of Crude Oil #4 and 30 g of divided bentonite gel (providing an oil to gel ratio of 70:30, and with a bentonite solids concentration of 3.5 wt % in the gel) was air oxidized at a temperature of 160° C. for 4 hours with an air purge of 80 scf/bbl/hour. About 25 g of water was expelled from the reactor. The product from the reaction was used to prepare a solids-stabilized 60/40 water-in-oil emulsion. The air oxidized product was blended with untreated crude oil, with a resulting blend consisting of 2.4 wt % of the air oxidized product, to 98.6% of the untreated crude oil.

The resulting 60/40 water-in-oil emulsion showed a 12% brine breakout in the micropercolation stability test. The emulsion was stable to ethane gas addition at 400 psi.

A mixture of 30 g of Crude Oil #4 and 70 g divided bentonite gel (oil to gel ratio of 30:70) was subjected to thermal air oxidation using as described above. Water was expelled from the reactor and the resulting product was an oily solid.

A solids-stabilized 60/40 water-in-oil emulsion was made using the oily solid product. The amount of oily solid used was 0.1% based on the weight of the untreated crude oil.

The resulting emulsion showed a 20% brine breakout in the micropercolation stability test. The dispersed water droplets were less than 4 microns in diameter.

Pretreatment of Oil by Thermal Treatment in an Inert Environment

Another method of pretreating an oil to enhance its ability to form a stable solids-stabilized water-in-oil emulsion is to thermally treat the oil in an inert environment prior to emulsification. This embodiment has the added benefit of reducing the viscosity of the solids stabilized water-in-oil emulsion.

The thermal treatment can:

a) generate asphaltenic solids which by themselves and/or in combination with externally added solids provide improved stability to the solids-stabilized water-in-oil emulsions, b) reduce viscosity of the crude oil which translates to lower emulsion viscosity of the solids-stabilized water-in-oil emulsions, and c) retain or degrade napthenic acids.

Preparation of Solids-Stabilized Water-in-Oil Emulsions with Thermally Treated Oil To enhance an oil's physical and chemical properties for the formation of a stable solids-stabilized emulsion, the oil may be thermally treated in an inert environment for a sufficient time, and at a sufficient temperature and pressure prior to emulsification. It is preferred to thermally treat the oil by heating to temperatures between 250° C.–450° C. at 30 to 300 pounds/square inch (psi) for 0.5 to 6 hours. The thermal treatment can occur in an inert atmosphere with no purge gas, or alternatively in the continuous presence of an inert purge gas. For the preferred method of thermally pretreating with no purge gas, the oil is initially purged with an inert gas like nitrogen for 30 minutes and the autoclave sealed and heated to the required temperature. For the alternative embodiment of thermally pretreating with a continuous purge of inert gas, an inert gas like argon is bubbled into the reactor at 200 to 450 standard cubic feet/barrel/hour (scf/bbl/hour) during the entire course of thermal treatment. This process is preferred if a greater reduction in viscosity is desired. The latter process will result in a greater percentage destruction of the surface active napthenic acids and is less preferred for the purposes of preparing a stable emulsion. The treatment severity is suitably chosen to produce the optimum viscosity reduction and napthenic acid retention. This treatment severity can vary from one oil to another but is within the ranges disclosed.

After the thermal treatment, solids are added followed by water and mixing to form the solids-stabilized water-in-oil emulsion. The addition of solids to the oil prior to the thermal pretreatment is also within the scope of the present invention. However, in the latter case, the potential for fouling of the process equipment needs to be addressed, and thermal treatment conditions optimized to minimize the equipment fouling.

The water addition is made in small aliquots or continuously and the mixture subjected to shear mixing, preferably at between 1000 to 12000 rpm, for a time sufficient to disperse the water as small droplets in the continuous oil phase. It is preferred to have a water concentration in the water-in-oil emulsion of 40 to 80%, more preferably 50 to 65%, and most preferably 60%. The temperature of the emulsion will rise above ambient temperature (25° C.) during mixing. Controlling the temperature of the emulsion during mixing is not critical. However, higher temperatures between 40° C. to 75° C. are preferred.

With regards to solids, the solid particles are preferred to be hydrophobic in nature. Fumed silica, sold under the trade name Aerosil® R 972 (product of DeGussa Corp.) was found to be effective for a number of different oils. Other solids like divided and oil wetted bentonite clays, kaolinite clays, organophilic clays or carbonaceous asphaltenic solids may also be used. The preferred concentration of solids to oil is in the range of 0.05 to 0.25 wt %.

It is preferred to thermally treat a slipstream of oil to a high level of severity and then mix the slipstream with a main stream of oil prior to addition of solids, water and mixing to form the emulsion. This main stream of oil is preferably untreated crude oil, however, it may be any oil, including oil that has been treated to enhance its ability to form a stable emulsion or treated to optimize its rheology.

To further stabilize the solids-stabilized emulsion made with thermally treated oil, it is anticipated to be particularly useful to add 0.1 to 1.0 wt % of a lignosulfonate additive to the oil prior to emulsification. This method of enhancing the stability of a solids-stabilized emulsion, i.e. addition of a lignosulfonate additive, is described above.

Dilute acid can also be added to the oil prior to emulsification, which will further enhance the emulsion's stability and reduce the emulsion's viscosity. This dilute acid addition is also described herein.

The method of thermally treating oil before emulsification has the added benefit of decreasing the solids-stabilized emulsion's viscosity, as compared to a solids-stabilized emulsion made with untreated oil. This ability to manipulate the viscosity of the emulsion allows the user to optimally match the rheological characteristics of the emulsion to that of the oil to be recovered specifically for the particular type EOR method used. Gas may also be added to further lower the viscosity of the emulsion.

Yet another method to reduce the viscosity of a thermally treated solids-stabilized emulsion is to age the emulsion. The thermally treated solids-stabilized emulsion can be aged by simply allowing the emulsion to rest at room temperature or at an elevated temperature for a sufficient period of time. The viscosity of the emulsion can be reduced by more than 50% by using this method. The aging process can be accelerated by centrifugation, preferably repeated centrifugation, which will produce a similar reduction in viscosity of the thermally treated solids stabilized emulsion. Centrifugation is conducted preferably at temperatures between 35° C. and 80° C. for 15 minutes to 2 hours at 500 to 10,000 rpm.

EXAMPLES

In a typical experiment, 200 g of oil was placed in a PARR autoclave and heated to temperatures of 150 to 450° C. for 0.5 to 6 hours at pressures ranging from 30 to 280 psi. The thermal pretreatment occurred either an inert atmosphere with no purge gas, or alternatively in the continuous presence of a purge gas. For thermal pretreatment with no purge gas, the oil was initially purged with an inert gas like nitrogen for 30 minutes and the autoclave sealed and heated to the required temperature. For thermal pretreatment with a continuous purge of inert gas, an inert gas like argon was bubbled into the reactor at 200 to 450 scf/bbl/hour during the entire course of thermal treatment. A hydrophobic silica, Aerosil® R 972, was then added to the heat treated oil. Mixing using a Silverson homogenizer followed solids addition. Finally, water was added to the oil and solid particles in small aliquots and mixed to provide a solids-stabilized water-in-oil emulsion.

The thermal pretreatment method was demonstrated at three levels of severity, which impacted the following oil properties: (1) total acid number (TAN), (2) amount of n-heptane insolubles, (3) toluene equivalence (measure of solubility of the thermally generated asphaltenes), and (4) viscosity.

The emulsions prepared by thermally treated oil were subjected to the following tests:

1. Shelf stability at 25° C. for 48 hours
2. Optical microscopy and NMR for determination of water droplet size/size distribution
3. Centrifuge stability (as described in Appendix-1)
4. Emulsion stability: flow through a sand pack (details of the micropercolation test procedure is given in Appendix-1)
5. Emulsion rheology using a Brookfield® viscometer (cone(#5 1) and plate configuration) at 35 or 60° C. in a shear range of 1.92 to 384 $\sec^{-1}$.

Example-1

A 60/40 water-in-oil emulsion was prepared using Crude Oil #2 without any thermal treatment, but with addition of 0.15 wt % hydrophobic silica (Aerosil® R 972). This emulsion, though shelf-stable, was unstable in the centrifuge and micropercolation tests. Dispersed water droplets ranged in size from 0.4 to 80 microns in diameter.

Example-2

Crude Oil #2 was thermally treated at 360° C. for 6 hours at 280 psi in an inert environment, using a nitrogen preflush. The resulting oil's viscosity at 35° C. and 9.6 $\sec^{-1}$ was lowered from 643 centipoise (cP) to 328 cP. The TAN was reduced from 6.6 to 3.9. The toluene equivalence increased from 14 to 31 while the n-heptane insolubles remained unchanged at 2.7%.

Solid particles, 0.15 wt % Aerosil® R 972, were added to the thermally treated Crude Oil #2 followed by water and mixing to form a 60/40 water-in-oil solids-stabilized emulsion, as previously described. The resulting solids-stabilized emulsion had a viscosity of 5734 cP at 35° C. and 9.6 $\sec^{-1}$, which represented a 63% reduction in emulsion viscosity as compared to an untreated solids-stabilized emulsion made with untreated Crude Oil #2 and 0.15 wt % Aerosil® R 972. The NMR determined water droplet size distribution of the heat treated solids-stabilized emulsion indicates a narrow distribution of water droplets in the size range of 2 to 10 microns in diameter. The emulsion was stable to flow as no water breakout was observed in the micropercolation tests described in Appendix-1. The pH of the emulsion was about 6.2.

Example-3

Thermal treatment of Crude Oil #2 at 350° C. for 2 hours at 90 psi in an inert environment resulted in a treated oil whose viscosity at 35° C. and 9.6 $\sec^{-1}$ was lowered from 643 cP to 328 cP. The TAN was reduced from 6.6 to 5.1. The toluene equivalence increased from 14 to 25 while the n-heptane insolubles remained unchanged at 2.7%.

Addition of 0.15 wt % Aerosil® R 972 to the thermally treated oil followed by water and mixing, as previously described, provided a stable solids-stabilized 60/40 water-in-oil emulsion. NMR revealed a distribution of water droplets in the size range of 2 to 14 microns in diameter. A 14% water breakout in the micropercolation sandpack test and no water breakout in the microcentrifuge test were observed. The pH of the emulsion was 6.2. The viscosity of the emulsion at 35° C. and 9.6 $\sect^{-1}$ was 7373 cP, which represents a viscosity reduction of greater than one-half when compared to a similar solids-stabilized emulsion prepared from Crude Oil #2, that had been pretreated with dilute acid using the method described above.

Example-4

A 60/40 water-in-oil emulsion was prepared with another crude oil, Crude Oil #4, without any thermal pretreatment, but with the addition of 0.15% of Aerosilφ R 972. Crude Oil #4 does not form stable solids-stabilized emulsions by the method described in U.S. Pat. Nos. 5,927,404, 5,855,243 and 5,910,467. Physical properties for Crude Oil #4 are contained in Table 2. This emulsion, although shelf-stable, was unstable in the centrifuge and micropercolation tests. Dispersed water droplets ranged in size from 2 to 40 microns in diameter, and a 54% water breakout was observed in the micropercolation test, described in Appendix-1, using Berea sand. The viscosity of the emulsion at 60° C. and 9.6 $\sec^{-1}$ was 3644 cP.

General Test for Increase in Surface-Activity of Oil

Increases in the surface-activity of oil due to pretreatment can be measured by determining the decrease in interfacial tension between the oil and water. Interfacial tensions were determined by the standard pendant drop technique at 25° C. Results for untreated Crude Oil #4 and pretreated Crude Oil #4 are given below. Note that interfacial tension results for Crude Oil #4 treated with solid particles and sulfonation could not be measured using the standard pendant drop technique.

TABLE 13

Measurement of Interfacial Tension

| Oil | Interfacial Tension dynes/cm |
|---|---|
| Untreated Crude Oil #4 | 32.3 |
| Crude Oil #4 + solid particles (solids) | 32.6 |
| Crude Oil #4 + acid pretreatment + solids | 15.8 |
| Crude Oil #4 + lignosulfonate + solids | 12.5 |

Solids = 0.15 wt % Aerosil ® R 972
Lignosulfonate = 0.1 wt % ammonium lignosulfonate
Acid pretreatment = 8000 ppm sulfuric acid The present invention has been described in connection with its preferred embodiments. However persons skilled in the art will recognize that many modifications, alterations, and variations to the invention are possible without departing from the true scope of the invention. Accordingly, all such modifications, alterations, and variations shall be deemed to be included in this invention, as defined by the appended claims.

Appendix-1: Micro-Percolation Test for Emulsion Stability in Flow Through Porous Media The observation that emulsions that are unstable will form two separate macroscopic phases, an oil/emulsion phase and a water phase, is relied upon in order to ascertain the stability of an emulsion on flow through porous media in a rapid, convenient assay. A volume of emulsion that passes completely through the porous media can therefore be centrifuged to form two distinct phases, whose volumes can be used as a measure of the emulsion stability—the greater the proportion of water or water originally in the emulsion, that forms a clear, distinct phase after passage and centrifugation, the more unstable the emulsion. A convenient parameter to measure stability is therefore the "brine-breakout" or "bbo", defined as the fraction of the water or brine that is in the emulsion that forms the distinct separate aqueous phase. Since it is a proportion, the bbo is dimensionless and ranges between one (maximally unstable) and zero (maximally stable). The brine breakout is measured under a well-defined set of conditions.

A commercially available special fritted micro-centrifuge tube that is comprised of two parts is used as the container for the experiment. The bottom part is a tube that catches any fluid flowing from the top tube. The top part is similar to the usual polypropylene microcentrifuge tube, except that the bottom is a frit that is small enough to hold sand grains back, but allows the easy flow of fluid. In addition, the tubes come supplied with lids to each part, one of which serves also as a support that allows the top to be easily weighed and manipulated while upright. They are available from Princeton Separations, Inc., Adelphia N.J. and are sold under the name "CENTRI-SEP COLUMNS."

A heated centrifuge is used to supply the pressure to flow the emulsion fluid through a bit of sand placed in the upper tube. It was supplied by Robinson, Inc., (Tulsa, Okla.) Model 620. The temperature is not adjustable, but stabilizes at 72° C. under our conditions. The top speed is about 2400 revolutions per minute (RPM) and the radius to the sandpack is 8 centimeters (cm), which gives a centrifugal force of 520 g. All weights are measured to the nearest milligram.

The columns come supplied with a small supply of silica gel already weighed into the tube. This is discarded, and the weights of both sections noted. About 0.2 grams (g) of sand is weighed into the top and 0.2±0.01 g of oil added to the top. Typical sands used for this experiment are Berea or Ottowa sands. The sand that is used in this test can be varied according to one's purpose. For simplicity, one may use unsieved, untreated Ottawa sand, supplied by VWR Scientific Products. This gives a convenient, "forgiving" system because the sand particles are rather large and free of clay. Alternatively, one may use one fraction that passes through 100 Tyler mesh, but is retained by a 150 mesh, and another fraction that passes through the 150 Tyler mesh, blended in a ten to one ratio respectively. The tube is weighed again, then centrifuged for one minute at full speed on the heated centrifuge. The bottom tube is discarded and the top is weighed again, which gives the amount of sand and oil remaining in the top. The sand is now in an oil wetted state, with air and oil in the pore space.

Now, 0.18±0.02 g of emulsion is placed on top of the wetted sand, and the top is weighed again. A bottom tube is weighed and placed below this tube to catch the effluent during centrifugation.

A separate bottom tube is filled with 0.2 to 0.5 g of emulsion only. This serves as a control to determine if the centrifuging of the emulsion, without it being passed through the oil-wetted sand, causes brine to break from the emulsion. This step is known as the microcentrifuge test, and is also an indicator of emulsion stability.

Both tubes are then centrifuged for a noted time (15 to 45 minutes) depending on the oil viscosity and centrifuge speed. The object in adjusting the length of time is to get to a point where at least 75% of the emulsion arrives in the bottom tube after passing through the sand. If less than that appears, the assembly is centrifuged for an additional time (s).

After spinning, the weight of the top and bottom pieces are again recorded. If the emulsion is unstable, a clear water phase will be visible in the bottom of the tube, below an opaque, black emulsion/oil phase. The volume of water in the bottom receptacle is then measured by pulling it up into a precision capillary disposable pipette (100–200 microliters) fitted with a plunger. These are supplied by Drummond Scientific Co. (under the name "Wiretroll II"). The length of the water column is measured and converted to mass of water through a suitable calibration curve for the capillary. The water breakout can be then calculated from these measurements and the knowledge of the weight fraction of water in the emulsion originally.

We claim:

1. A method for enhancing the stability of a solids-stabilized water-in-oil emulsion, said method comprising the step of pretreating at least a portion of said oil prior to emulsification, said pretreating step comprising at least one of the steps of adding dilute mineral acid or acetic acid to said oil, adding a lignosulfonate to said oil, sulfonating said oil, thermally treating said oil at a pressure in the range of between about 30 psi to about 300 psi in an inert environment and thermally oxidizing said oil, wherein the severity of said thermal treatment of said oil is sufficient to reduce the viscosity of said solids-stabilized water-in-oil emulsion as compared to the viscosity of a solids-stabilized water-in-oil emulsion made with oil that has not been pretreated and wherein when said pretreating includes said dilute acid pretreatment said solids-stabilized emulsion is formed by adding water after said dilute acid pretreatment.

2. The method of claim 1, wherein said pretreating step comprises adding dilute acid to at least a portion of said oil prior to emulsification.

3. The method of claim 2, wherein said acid is added to said oil at a rate of from about 8 parts per million to about 30,000 parts per million.

4. The method of claim 3, wherein said method further comprises the steps of determining the pH of said water-in-oil emulsion following emulsification and if neccessary adjusting said pH so that it falls in the range of from about 5.0 to about 7.0.

5. The method of claim 4, wherein said pH of said water-in-oil emulsion is adjusted by adding ammonium hydroxide to said emulsion.

6. The method of claim 1, wherein said pretreating step comprises sulfonating at least a portion of said oil prior to emulsification.

7. The method of claim 6, wherein said step of sulfonating said oil comprises the addition of at least one sulfonating agent to said oil.

8. The method of claim 7, wherein said sulfonating agent is added to said oil at a rate of between about 0.5 wt % to about 5 wt %.

9. The method of claim 1, wherein said pretreating step comprises adding a lignosulfonate additive to at least a portion of said oil prior to emulsification.

10. The method of claim 9, wherein said lignosulfonate additive is added to said oil at a rate of between about 500 parts per million to about 5000 parts per million.

11. The method of claim 9 wherein said lignosulfonate additive is oil soluble.

12. The method of claim 9 wherein said lignosulfonate additive is water soluble.

13. The method of claim 1, wherein said pretreating step comprises thermally oxidizing at least a portion of said oil prior to emulsification.

14. The method of claim 13, wherein said thermal oxidation step is at a temperature of between about 110° C. to about 180° C.

15. The method of claim 13, wherein said thermal oxidation step is enhanced by addition of a catalyst.

16. The method of claim 1, wherein said pretreatment step comprises thermally treating at least a portion of said oil in an inert environment prior to emulsification.

17. The method of claim 16, wherein said thermal treatment step is at a temperature in a range of between about 250° C. to about 450° C.

18. The method of claim 16, further comprising the addition of dilute acid to said oil prior to emulsification, said dilute acid selected from the group consisting of mineral acids, organic acids, mixtures of at least two mineral acids, mixtures of at least two organic acids, and mixtures of at least one mineral acid and at least one organic acid.

19. The method of claim 16, further comprising the addition of a lignosulfonate additive to said oil prior to emulsification.

20. A method for recovering hydrocarbons from a subterranean formation, said method comprising the steps of:
   a) preparing a solids-stabilized water-in-oil emulsion by
      (1) pretreating at least a portion of said oil prior to emulsification, said pretreating step comprising at least one of the steps of adding dilute acid to said oil, adding a lignosulfonate additive to said oil, sulfonating said oil, thermally treating said oil at a pressure in the range of between about 30 psi to about 300 psi in an inert environment and thermally oxidizing said oil, wherein the severity of said thermal treatment of said oil is sufficient to reduce the viscosity of said solids-stabilized water-in-oil emulsion as compared to the viscosity of a solids-stabilized water-in-oil emulsion made with oil that has not been pretreated and wherein when said pretreating includes said dilute acid pretreatment said solids-stabilized emulsion is formed by adding water after said dilute acid pretreatment;
      (2) adding solid particles to said oil prior to emulsification; and
      (3) adding water and mixing until said solids-stabilized water-in-oil emulsion in formed;
   b) injecting said solids-stabilized water-in-oil emulsion into said subterranean formation; and
   c) recovering hydrocarbons from said subterranean formation.

21. The method of claim 20, wherein said solids-stabilized water-in-oil emulsion is used as a drive fluid to displace hydrocarbons in said subterranean formation.

22. The method of claim 20, wherein said solids-stabilized water-in-oil emulsion is used as a barrier fluid to divert the flow of hydrocarbons in said subterranean formation.

23. The method of claim 20, wherein said pretreating step comprises adding dilute acid to at least a portion of said oil prior to emulsification.

24. The method of claim 23, wherein said acid is selected from the group consisting of sulfuric acid and hydrochloric acid.

25. The method of claim 23, wherein said solid particles are hydrophobic solid particles.

26. The method of claim 23, wherein said dilute acid is added at a treat rate of between about 8 parts per million to about 30,000 parts per million.

27. The method of claim 26, further comprising the steps of determining the pH of said water-in-oil emulsion following emulsification, and if necessary adjusting said pH so that it falls in the range of from about 5.0 to about 7.0.

28. The method of claim 27, wherein said pH of said water-in-oil emulsion is adjusted by adding ammonium hydroxide to said emulsion.

29. The method of claim 23, wherein said step of adding solid particles to said oil occurs after said step of adding dilute acid to said oil.

30. The method of claim 23, wherein said step of adding solid particles to said oil occurs before said step of adding said dilute acid to said oil.

31. The method of claim 23, wherein said solid particles are added at a treat rate of about 0.05 wt % to about 0.25 wt % based on the weight of the oil.

32. The method of claim 20, wherein said pretreating step comprises sulfonating at least a portion of said oil prior to emulsification.

33. The method of claim 32, wherein said step of sulfonating said portion of oil comprises the addition of at least one sulfonating agent to said oil.

34. The method of claim 33, wherein said sulfonating agent is sulfuric acid.

35. The method of claim 33, wherein said sulfonating agent is added to said oil at a treat rate of from about 0.5 wt % to about 5 wt %.

36. The method of claim 32, wherein said solid particles comprise hydrophobic solid particles.

37. The method of claim 32, wherein said solid particles comprise functionalized asphalts.

38. The method of claim 32, wherein said solid particles comprise unfunctionalized asphalts.

39. The method of claim 32, wherein said step of adding solid particles to said oil occurs after said sulfonation step.

40. The method of claim 32, wherein said step of adding solid particles to said oil occurs before said sulfonation step.

41. The method of claim 32, wherein said solid particles are added at a treat rate of about 0.05 wt % to about 2.0 wt % based on the weight of the oil.

42. The method of claim 20, wherein said pretreating step comprises adding a lignosulfonate additive to at least a portion of said oil prior to emulsification.

43. The method of claim 42, wherein said lignosulfonate additive is added to said oil at a treat rate of between about 500 parts per million to about 5000 parts per million.

44. The method of claim 42, wherein said solid particles comprise hydrophobic solid particles.

45. The method of claim 44, wherein said lignosulfonate additive comprises at least one water soluble lignosulfonate additive.

46. The method of claim 42, wherein said solid particles comprise hydrophilic solid particles.

47. The method of claim 46, wherein said lignosulfonate additive comprises at least one oil soluble lignosulfonate additive.

48. The method of claim 42, wherein said step of adding solid particles to said oil occurs before said step of adding said lignosulfonate additive to said oil.

49. The method of claim 42, wherein said step of adding solid particles to said oil occurs after said step of adding said lignosulfonate additive to said oil.

50. The method of claim 42, wherein said solid particles are combined with said lignosulfonate additive, and then said combination is added to said oil before said emulsification.

51. The method of claim 42, wherein said solid particles are added at a treat rate of about 0.05 wt % to about 0.25 wt % based on the weight of the oil.

52. The method of claim 20, wherein said pretreating step comprises thermally oxidizing at least a portion of said oil prior to emulsification.

53. The method of claim 52, wherein said oil is thermally oxidized at a temperature of between about 110° C. to about 180° C.

54. The method of claim 52, wherein said thermal oxidation step is enhanced by addition of a catalyst.

55. The method of claim 52, wherein said solid particles are hydrophobic solid particles.

56. The method of claim 52, wherein said solid particles are hydrophilic solid particles.

57. The method of claim 52, wherein said solid particles are bentonite clay.

58. The method of claim 52, wherein said solid particles are added to said oil before said thermal oxidation step.

59. The method of claim 52, wherein said solid particles are added to said oil after said thermal oxidation step, and before said emulsification.

60. The method of claim 52, wherein said solid particles are added as a gel comprised of solid particles and water.

61. The method of claim 60, wherein said solid particles comprise about 1.0 wt % to about 30 wt % of said gel based on the weight said water.

62. The method of claim 60, wherein said gel is added to said oil in a treat range of about 5 wt % to about 95 wt % of said gel to said oil.

63. The method of claim 52, wherein said solid particles are added to said oil at a treat rate of between about 0.05 wt % to about 5 wt % based on the weight of the oil.

64. The method of claim 20, wherein said pretreatment step comprises thermally treating at least a portion of said oil in an inert environment prior to emulsification.

65. The method of claim 64, wherein said oil is thermally treated at a temperature in the range of between about 250° C. to about 450° C.

66. The method of claim 64, wherein said solid particles are hydrophobic solid particles.

67. The method of claim 64, wherein said solid particles are added to said oil before said thermal treatment step, and before said emulsification.

68. The method of claim 64, wherein said solid particles are added to said oil after said thermal treatment step, and before said emulsification.

69. The method of claim 64, wherein said solid particles are added at a treat rate of about 0.05 wt % to about 0.25 wt % based on the weight of the oil.

70. The method of claim 64, wherein said step of thermally treating said oil further comprises the addition of dilute acid to said oil prior to emulsification, said dilute acid selected from the group consisting of mineral acids, organic acids, mixtures of at least two mineral acids, mixtures of at least two organic acids, and mixtures of at least one mineral acid and at least one organic acid.

71. The method of claim 64, wherein said step of thermally treating said oil further comprises the addition of a lignosulfonate additive to said oil prior to emulsification.

72. The method of claim 64, said method further comprising the step of aging said solids-stabilized water-in-oil emulsion following emulsification whereby the viscosity of said emulsion is reduced.

73. The method of claim 72, wherein said step of aging said emulsion comprises centrifuging said emulsion at about 500 rpm to about 10,000 rpm for about 15 minutes to about 2 hours.

74. The method of claim 73, wherein said step of centrifuging said emulsion is repeated.

75. A solids-stabilized water-in-oil emulsion for use in recovering hydrocarbons from a subterranean formation, said emulsion comprising (a) oil, wherein at least a portion of said oil is pretreated by at least one of the steps of adding dilute mineral acid or acetic acid to said oil, adding a lignosulfonate additive to said oil, sulfonating said oil, thermally treating said oil at a pressure in the range of between about 30 psi to about 300 psi in an inert environment and thermally oxidizing said oil, wherein the severity of said thermal treatment of said oil is sufficient to reduce the viscosity of said solids-stabilized water-in-oil emulsion as compared to the viscosity of a solids-stabilized water-in-oil emulsion made with oil that has not been pretreated and wherein when said pretreating includes said dilute acid pretreatment said solids-stabilized emulsion is formed by adding water after said dilute acid pretreatment;

(b) water droplets suspended in said oil; and (c) solid particles which are insoluble in said oil and said water at the conditions of said subterranean formation.

76. The method of claim 1, wherein said oil is crude oil.

77. The method of claim 20, wherein said oil is crude oil.

78. The emulsion of claim 75, wherein said oil is crude oil.

79. A method for enhancing the stability of a solids-stabilized water-in-oil emulsion, said method comprising the step of pretreating at least a portion of said oil prior to emulsification, said pretreating step comprising at least one of the steps of adding dilute acid to said oil, adding a lignosulfonate to said oil, sulfonating said oil, thermally treating said oil at a pressure in the range of between about 30 psi to about 300 psi in an inert environment and thermally oxidizing said oil, wherein said oil is crude oil that lacks adequate polar and asphaltene compounds to form stable solids-stabilized water-in-oil emulsions without oil pretreatment and wherein when said pretreating includes said dilute acid pretreatment said solids-stabilized emulsion is formed by adding water after said dilute acid pretreatment.

80. The method of claim 4, wherein said acid is selected from the group consisting of sulfuric acid and hydrochloric acid.

* * * * *